US012277917B2

(12) United States Patent
Yamada

(10) Patent No.: US 12,277,917 B2
(45) Date of Patent: Apr. 15, 2025

(54) DISPLAY METHOD AND DISPLAY DEVICE

(71) Applicant: SEIKO EPSON CORPORATION, Tokyo (JP)

(72) Inventor: Hiromasa Yamada, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/477,622

(22) Filed: Sep. 29, 2023

(65) Prior Publication Data

US 2024/0112648 A1 Apr. 4, 2024

(30) Foreign Application Priority Data

Sep. 30, 2022 (JP) ................................ 2022-157658

(51) Int. Cl.

| | |
|---|---|
| ***G09G 5/14*** | (2006.01) |
| ***G09G 5/00*** | (2006.01) |
| *G09G 3/00* | (2006.01) |

(52) U.S. Cl.

CPC ............... *G09G 5/14* (2013.01); *G09G 5/006* (2013.01); *G09G 3/002* (2013.01); *G09G 2354/00* (2013.01)

(58) Field of Classification Search

CPC .......... G09G 5/14; G09G 5/006; G09G 3/002; G09G 2354/00

See application file for complete search history.

(56) References Cited

U.S. PATENT DOCUMENTS

| | | | | |
|---|---|---|---|---|
| 2005/0146731 | A1 | 7/2005 | Mitani | |
| 2009/0268960 | A1 | 10/2009 | Imai et al. | |
| 2012/0050239 | A1 * | 3/2012 | Kasahara | H04N 21/43635 345/204 |
| 2016/0353096 | A1 | 12/2016 | Tomono et al. | |
| 2017/0018105 | A1 | 1/2017 | Hasegawa et al. | |
| 2020/0053311 | A1 * | 2/2020 | Ogiso | H04N 23/88 |
| 2020/0092525 | A1 | 3/2020 | Koike et al. | |

FOREIGN PATENT DOCUMENTS

| | | | |
|---|---|---|---|
| JP | 2005-196734 | A | 7/2005 |
| JP | 2006-107014 | A | 4/2006 |
| JP | 2007-140180 | A | 6/2007 |
| JP | 2009-267929 | A | 11/2009 |
| JP | 2011-166315 | A | 8/2011 |
| JP | 2012-047843 | A | 3/2012 |
| JP | 2015-179502 | A | 10/2015 |
| JP | 2016-018249 | A | 2/2016 |
| JP | 2016-224225 | A | 12/2016 |
| JP | 2020-053009 | A | 4/2020 |
| JP | 2021-022239 | A | 2/2021 |

OTHER PUBLICATIONS

HP (User guide, May 2017, p. 15) (Year: 2017).*

* cited by examiner

*Primary Examiner* — Hang Lin

(74) *Attorney, Agent, or Firm* — Dority & Manning, P.A.

(57) ABSTRACT

A display method includes: presetting a display mode for displaying a setting screen; accepting an input of an image signal from an external device; and displaying the setting screen, when the image signal is inputted and it is determined that the display mode is in operation.

20 Claims, 10 Drawing Sheets

DISPLAY METHOD AND DISPLAY DEVICE

The present application is based on, and claims priority from JP Application Serial Number 2022-157658, filed Sep. 30, 2022, the disclosure of which is hereby incorporated by reference herein in its entirety.

BACKGROUND

1. Technical Field

The present disclosure relates to a display method and a display device.

2. Related Art

A display device that displays a user setting image is known. A display device described in JP-A-2007-140180 takes in an image signal inputted from an external device. The display device determines the type of the inputted image signal. When unable to determine the type of the inputted image signal, the display device generates a user setting image. The display device displays the generated user setting image. The display device displays the user setting image and thus prompts a user to update setting data. Meanwhile, when able to determine the type of the inputted image signal, the display device does not display the user setting image.

Conditions for displaying the user setting image are limited. Therefore, the user setting image may not necessarily be displayed to a user who is not very familiar with user settings.

SUMMARY

According to an aspect of the present disclosure, a display method includes: presetting a display mode for displaying a setting screen; accepting an input of an image signal from an external device; and displaying the setting screen, when the image signal is inputted and it is determined that the display mode is in operation.

According to another aspect of the present disclosure, a display device includes: an interface circuit that accepts an input of an image signal outputted from an external device; one or a plurality of processors that execute presetting a display mode for displaying a setting screen, and displaying the setting screen, when the image signal is inputted to the interface circuit and it is determined that the display mode is in operation; and a display panel that displays the setting screen under control of the one or plurality of processors.

DESCRIPTION OF EMBODIMENTS

Figure 1:
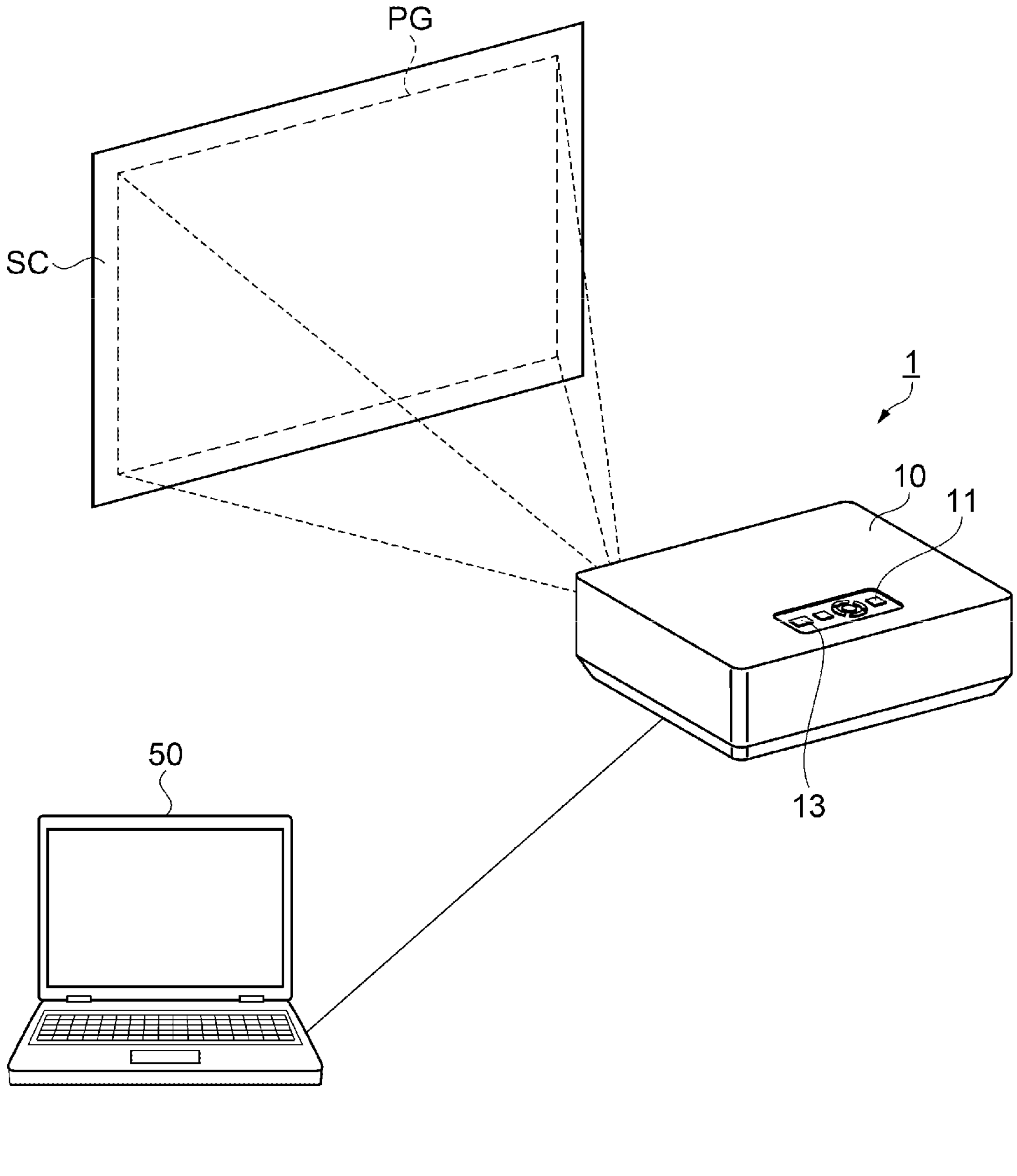
FIG. 1 shows a schematic configuration of a projection system.

FIG. 1 shows a schematic configuration of a projection system 1. The projection system 1 has a projector 10 and an image providing device 50. The projector 10 projects a projection image PG onto a projection surface SC. The projection system 1 shown in FIG. 1 has one image providing device 50 but is not limited to this configuration. A plurality of image providing devices 50 may be connected to the projector 10.

The projection surface SC displays the projection image PG projected from the projector 10. The projection surface SC shown in FIG. 1 is formed of a screen but is not limited to this configuration. The projection surface SC may be an indoor wall, a ceiling, an external wall of a building, or the like. The projection surface shape of the projection surface SC is not limited to a planar shape. The projection surface SC may be a curved surface, a concave-convex surface, or a three-dimensionally shaped surface such as a spherical surface.

The projector 10 is arranged at a position facing the projection surface SC. The projector 10 is communicatively connected to the image providing device 50. The projector 10 may also be communicatively connected to a control device that is different from the image providing device 50. The projector 10 receives image data from the image providing device 50. The projector 10 projects the projection image PG onto the projection surface SC, based on the image data. The projector 10 may also project the projection image PG onto the projection surface SC, based on internally stored display data. The projector 10 is equivalent to an example of a display device.

The projector 10 has an operation panel 11. The operation panel 11 is operated by a user. The user makes an operation input to the operation panel 11 and thus configures various settings of the projector 10. The operation panel 11 has a plurality of input buttons 13.

The image providing device 50 is communicatively connected to the projector 10. The image providing device 50 transmits image data to the projector 10. The image providing device 50 may have a function of adjusting the image shape of the projection image PG projected onto the projection surface SC by the projector 10. The image providing device 50 is a tablet terminal, a smartphone, a mobile computer, a desktop computer, or the like. The image providing device 50 is equivalent to an example of an external device.

Figure 2:
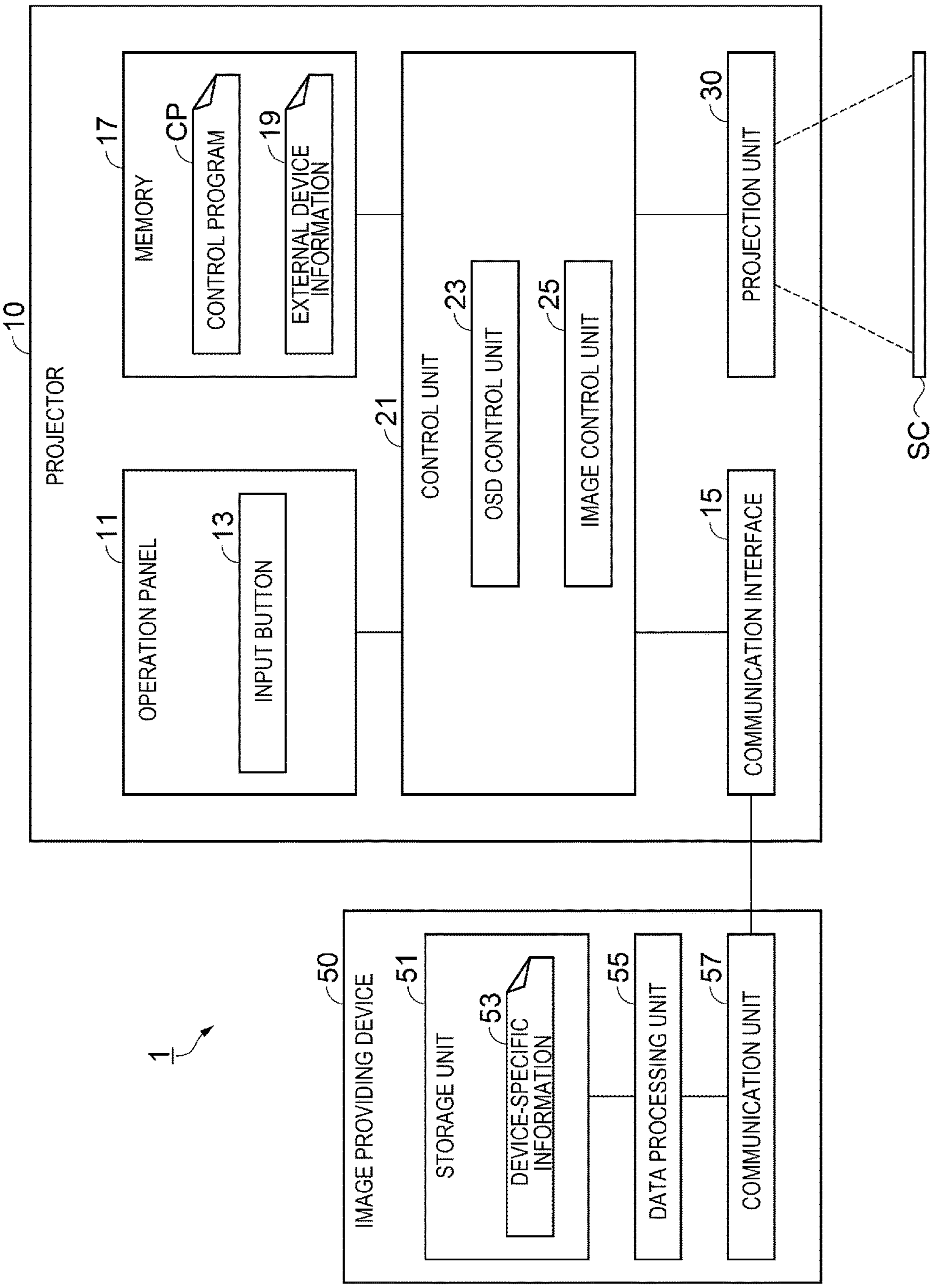
FIG. 2 shows a block configuration of the projection system.

FIG. 2 shows the block configuration of the projection system 1. FIG. 2 shows the block configuration of the projector 10 and the block configuration of the image providing device 50. The projector 10 is communicatively connected to the image providing device 50 via a wire or a wirelessly.

The projector 10 has the operation panel 11, a communication interface 15, a memory 17, a control unit 21, and a projection unit 30. The image providing device 50 has a storage unit 51, a data processing unit 55, and a communication unit 57.

The operation panel 11 has a plurality of input buttons 13. In an example, the plurality of input buttons 13 include a menu button, a return button, a decision button, a selection button, an adjustment button, an initial value button, and the like. The user suitably selects a desired input button 13 from among the plurality of input buttons 13 and makes an operation input to the input button 13. The user may use a remote controller, not illustrated, instead of the operation panel 11. The user makes an operation input, using the remote controller. The remote controller has a plurality of input buttons similarly to the operation panel 11. In other words, the operation panel 11 or the remote controller accepts an operation from the user.

The communication interface 15 is an interface circuit for communicatively connecting to the image providing device 50. The communication interface 15 connects to the image providing device 50 via a wire or wirelessly in conformity with a predetermined communication protocol. The communication interface 15 includes a wired connector and a wireless communication port. The wired connector is an HDMI (High-Definition Multimedia Interface) connector, a USB (Universal Serial Bus) connector, a LAN (local area network) connector, or the like. The wireless communication port is a Wi-Fi communication port, a Bluetooth communication port, or the like. HDMI, Wi-Fi, and Bluetooth are registered trademarks. The communication interface 15 accepts an input of image data, device information, and the like from the image providing device 50. The communication interface 15 may receive setting data or the like of the projector 10 from the image providing device 50. The communication interface 15 is equivalent to an example of a reception unit. The image data is data related to an image, including still image data, dynamic image data, or the like. The image data may include audio data. The image data is equivalent to an example of an image signal.

The memory 17 stores image data and various program data. The memory 17 stores a control program CP to be executed by the control unit 21. The memory 17 stores the image data, the device information, and the like transmitted from the image providing device 50. The memory 17 stores various screen data and the like. The screen data is data for causing the projection unit 30 to display an operation screen such as a scene setting screen 100 or a detailed setting screen 110. The scene setting screen 100 and the detailed setting screen 110 will be described later. The memory 17 stores mode information. The mode information represents a screen display mode or a screen non-display mode. The memory 17 is formed of a ROM (read-only memory), a RAM (random-access memory) or the like. The control program CP is equivalent to an example of a program.

The memory 17 stores external device information 19. The external device information 19 is device information about an external device communicatively connected via the communication interface 15. The external device information 19 includes device-specific information 53. The device-specific information 53 will be described later. The memory 17 stores the device-specific information 53 or the like in an inputted data format or in a processed data format. The external device information 19 is equivalent to an example of identification information.

The memory 17 stores an initial set value group. The initial set value group is set data including an initial set value corresponding to a setting item. The initial set value group is set corresponding to a scene type. The scene type is the content type of the projection image PG projected on the projection surface SC, based on the image data. The scene type includes game, movie, presentation, and the like. The initial set value group is stored for each scene type. The memory 17 stores a plurality of initial set value groups. When the initial set value group is modified, the memory 17 stores the modified initial set value group, as set value group. The plurality of initial set value groups include a standard set value group. The standard set value group is set data including a standard value of each setting item. The standard value of each setting item is a value predetermined by the manufacturer of the projector 10. The standard set value group may be stored as a common set value group corresponding to a plurality of scene types.

The control unit 21 is a controller that controls the projector 10. In an example, the control unit 21 is a processor having a CPU (central processing unit). The control unit 21 is formed of one or a plurality of processors. The control unit 21 may have a semiconductor memory such as a ROM or a RAM. The semiconductor memory functions as a work area of the control unit 21. The control unit 21 executes the control program CP stored in the memory 17 and thus functions as an OSD control unit 23 and an image control unit 25. The control unit 21 is equivalent to an example of a display control unit.

The OSD control unit 23 performs display control of various screens projected on the projection surface SC. OSD is an abbreviation of on-screen display. The OSD control unit 23 is a functional unit that operates when the control unit 21 executes the control program CP. The OSD control unit 23 controls whether or not to display an operation screen such as the scene setting screen 100. The OSD control unit 23 controls the display content of the operation screen such as the scene setting screen 100. The OSD control unit 23 is equivalent to an example of the display control unit.

The OSD control unit 23 controls whether or not to display the scene setting screen 100. The OSD control unit 23 can set mode information. The mode information represents a screen display mode or a screen non-display mode. The OSD control unit 23 can execute a switching setting to switch the mode information from the screen display mode to the screen non-display mode or from the screen non-display mode to the screen display mode. The OSD control unit 23 causes the memory 17 to store the screen display mode or the screen non-display mode, which is the mode information. The memory 17 stores the mode information.

The screen display mode is a mode for displaying the scene setting screen 100 when image data is inputted from the image providing device 50. The screen display mode is equivalent to an example of a display mode. The scene setting screen 100 is equivalent to an example of a setting screen. The screen display mode is preset as an initial setting at the time of shipment from the plant or when the projector 10 is reset, or the like. The screen display mode may be set by a manager or the like of the projector 10 via a management screen of the projector 10. When the manager or the like inputs a setting to switch from the screen non-display mode to the screen display mode on the management screen, the OSD control unit 23 executes the switching setting to switch from the screen non-display mode to the screen display mode.

The screen non-display mode is a mode for not displaying the scene setting screen 100 when image data is inputted from the image providing device 50. The screen non-display mode is equivalent to an example of a non-display mode. The user of the projector 10 can set the screen non-display mode via the scene setting screen 100 when the scene setting screen 100 is displayed. When the user inputs a setting to switch from the screen display mode to the screen non-display mode on the scene setting screen 100, the OSD control unit 23 executes the switching setting to switch from the screen display mode to the screen non-display mode. On the scene setting screen 100, the screen non-display mode can be set.

The OSD control unit 23 acquires the mode information stored in the memory 17, when image data is inputted from the image providing device 50. The OSD control unit 23 determines whether the mode information represents the screen display mode or not. When it is determined that the mode information represents the screen display mode, the OSD control unit 23 displays the scene setting screen 100. When it is determined that the mode information does not represent the screen display mode, the OSD control unit 23 determines that the mode information represents the screen non-display mode for not displaying the scene setting screen 100. When it is determined that the mode information represents the screen non-display mode, the OSD control unit 23 does not display the scene setting screen 100.

The OSD control unit 23 causes the projection unit 30 to project various operation screens such as the scene setting screen 100. The OSD control unit 23 reads out the screen data stored in the memory 17. The OSD control unit 23 transmits the read-out screen data to the projection unit 30 and causes the projection unit 30 to project an operation screen based on the screen data. The OSD control unit 23 causes the projection unit 30 to project the operation screen and thus to display the operation screen on the projection surface SC.

The memory 17 stores a plurality of screen data. The plurality of screen data include scene setting screen data and detailed setting screen data. The scene setting screen data is data for displaying the scene setting screen 100. The detailed setting screen data is data for displaying the detailed setting screen 110.

The image control unit 25 performs image processing on the image data acquired from the image providing device 50. The image control unit 25 corrects the image data, based on a set value group. The set value group is set, based on input data accepted via the scene setting screen 100 or the detailed setting screen 110. The set value group is set data including set values corresponding to a plurality of setting items. The set value group is stored in the memory 17. The image control unit 25 reads out the set value group from the memory 17. Details of the set value group will be described later. The image control unit 25 generates corrected image data, which is the image data that is corrected. The image control unit 25 transmits the corrected image data thus generated, to the projection unit 30.

The projection unit 30 projects the projection image PG onto the projection surface SC under the control of the control unit 21. The projection unit 30 projects the projection image PG based on the corrected image data onto the projection surface SC. The projection unit 30 projects various operation screens onto the projection surface SC, based on the screen data. The various operation screens include the scene setting screen 100, the detailed setting screen 110, and the like. The various operation screens are an example of the projection image PG. Details of the projection unit 30 will be described later. The projection unit 30 is equivalent to an example of a display unit.

The image providing device 50 outputs image data to the projector 10. The image providing device 50 is connected to the communication interface 15 of the projector 10. The image providing device 50 has the storage unit 51, the data processing unit 55, and the communication unit 57.

The storage unit 51 stores various image data, device information, and the like. The storage unit 51 stores various information about the image providing device 50 including the device-specific information 53, as the device information. The device-specific information 53 is information that identifies the image providing device 50. The device-specific information 53 is the IP address, the MAC address, the product name, the serial number, and the like. The device-specific information 53 is equivalent to an example of an identification signal. The storage unit 51 is formed of a ROM, a RAM or the like. The storage unit 51 may be formed of a magnetic recording device such as an HDD (hard disk drive).

The data processing unit 55 is an image processing controller that generates various image data. The data processing unit 55 causes various applications to operate and thus generates image data. The data processing unit 55 transmits the generated image data to the communication unit 57. The data processing unit 55 may transmit the generated image data to the storage unit 51 and may cause the storage unit 51 to store the image data. The data processing unit 55 is formed of one or a plurality of image processing processors.

The communication unit 57 is a communication circuit that communicatively connects to the projector 10. The communication unit 57 connects to the projector 10 via a wire or wirelessly in conformity with a predetermined communication protocol. The communication unit 57 communicatively connects to the communication interface 15. The communication unit 57 includes a wired connector and a wireless communication port. The wired connector is an HDMI connector, a USB connector, a LAN connector or the like. The wireless communication port is a Wi-Fi communication port, a Bluetooth communication port or the like. The communication unit 57 transmits image data to the projector 10. The communication unit 57 may receive various notification data or the like from the projector 10.

When outputting image data to the communication interface 15, the communication unit 57 may add the device-specific information 53 to the image data. When communicatively connected to the communication interface 15, the communication unit 57 may output the device-specific information 53 to the communication interface 15.

Figure 3:
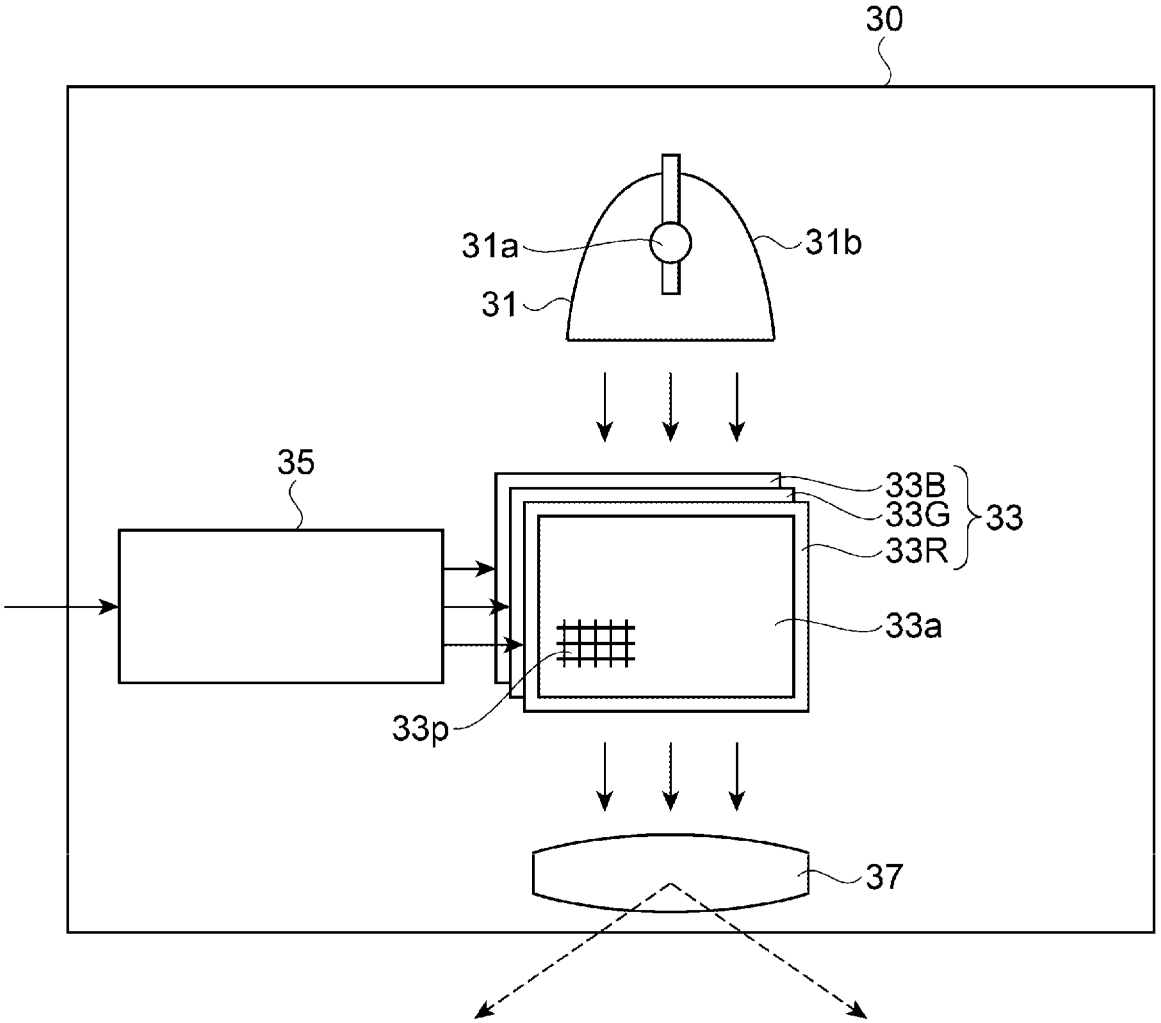
FIG. 3 shows a schematic configuration of a projection unit.

FIG. 3 shows a schematic configuration of the projection unit 30. FIG. 3 shows an example of the projection unit 30. The projection unit 30 has a light source 31, three liquid crystal light valves 33, a light valve drive unit 35, and a projection lens 37.

The light source 31 emits light to the liquid crystal light valve 33. The light source 31 has a light source unit 31*a*, a reflector 31*b*, an optical integration system, not illustrated, and a color separation system, not illustrated. The light source unit 31*a* emits light. The light source unit 31*a* is formed of a xenon lamp, an ultra-high-pressure mercury lamp, an LED (light-emitting diode), or a laser light source or the like. The light source 31 emits light under the control of the control unit 21. The reflector 31*b* reduces the variation in the direction of emission of the light emitted from the light source unit 31*a*. The optical integration system reduced the variation in the luminance distribution of the light emitted from the light source 31. The light passed through the reflector 31*b* becomes incident on the color separation system. The color separation system separates the incident light into red, green, and blue color light components.

The liquid crystal light valve 33 modulates the light emitted from the light source 31. The liquid crystal light valve 33 modulates the light and thus generates the projection image PG. The liquid crystal light valve 33 is formed of a liquid crystal panel made up of a pair of transparent substrates and a liquid crystal encapsulated between the substrates, or the like. The liquid crystal light valve 33 has a rectangular pixel area 33*a* including a plurality of pixels 33*p* arranged in the form of a matrix. In the liquid crystal light valve 33, a drive voltage is applied to the liquid crystal on a per pixel 33*p* basis. The projection unit 30 shown in FIG. 3 has three liquid crystal light valves 33. The liquid crystal light valve 33 is an example of a display panel. The projection unit 30 is configured having the liquid crystal light valve 33 but is not limited to this configuration. The projection unit 30 may be configured including one or more DMDs (digital mirror devices). In this case, the DMD is an example of the display panel.

The three liquid crystal light valves 33 are a liquid crystal light valve for red light 33R, a liquid crystal light valve for green light 33G, and a liquid crystal light valve for blue light 33B. The red color light component separated by the color separation system becomes incident on the liquid crystal light valve for red light 33R. The green color light component separated by the color separation system becomes incident on the liquid crystal light valve for green light 33G. The blue color light component separated by the color separation system becomes incident on the liquid crystal light valve for blue light 33B.

The light valve drive unit 35 applies a drive voltage to each pixel 33*p*, based on the image data received from the control unit 21. The light valve drive unit 35 is, for example, a control circuit. The drive voltage is supplied by a drive source, not illustrated. The light valve drive unit 35 may apply the drive voltage to each pixel 33*p*, based on the image data corrected by the image control unit 25. As the light valve drive unit 35 applies the drive voltage to each pixel 33*p*, each pixel 33*p* is set to a light transmittance based on the image data. The light emitted from the light source 31 is transmitted through the pixel area 33*a* and thus modulated. The three liquid crystal light valves 33 form color component images corresponding to the respective colors thereof.

The projection lens 37 combines together the color component images formed by the liquid crystal light valves 33 and projects the combined image in an enlarged form. The projection lens 37 projects the projection image PG onto the projection surface SC. The projection image PG is a multiple-color image formed of the color component images combined together.

First Embodiment

A first embodiment represents a display method for displaying the scene setting screen 100. In the first embodiment, a display method for displaying a first scene setting screen 100*a*, which is an example of the scene setting screen 100, is described. The first scene setting screen 100*a* will be described later.

Figure 4:
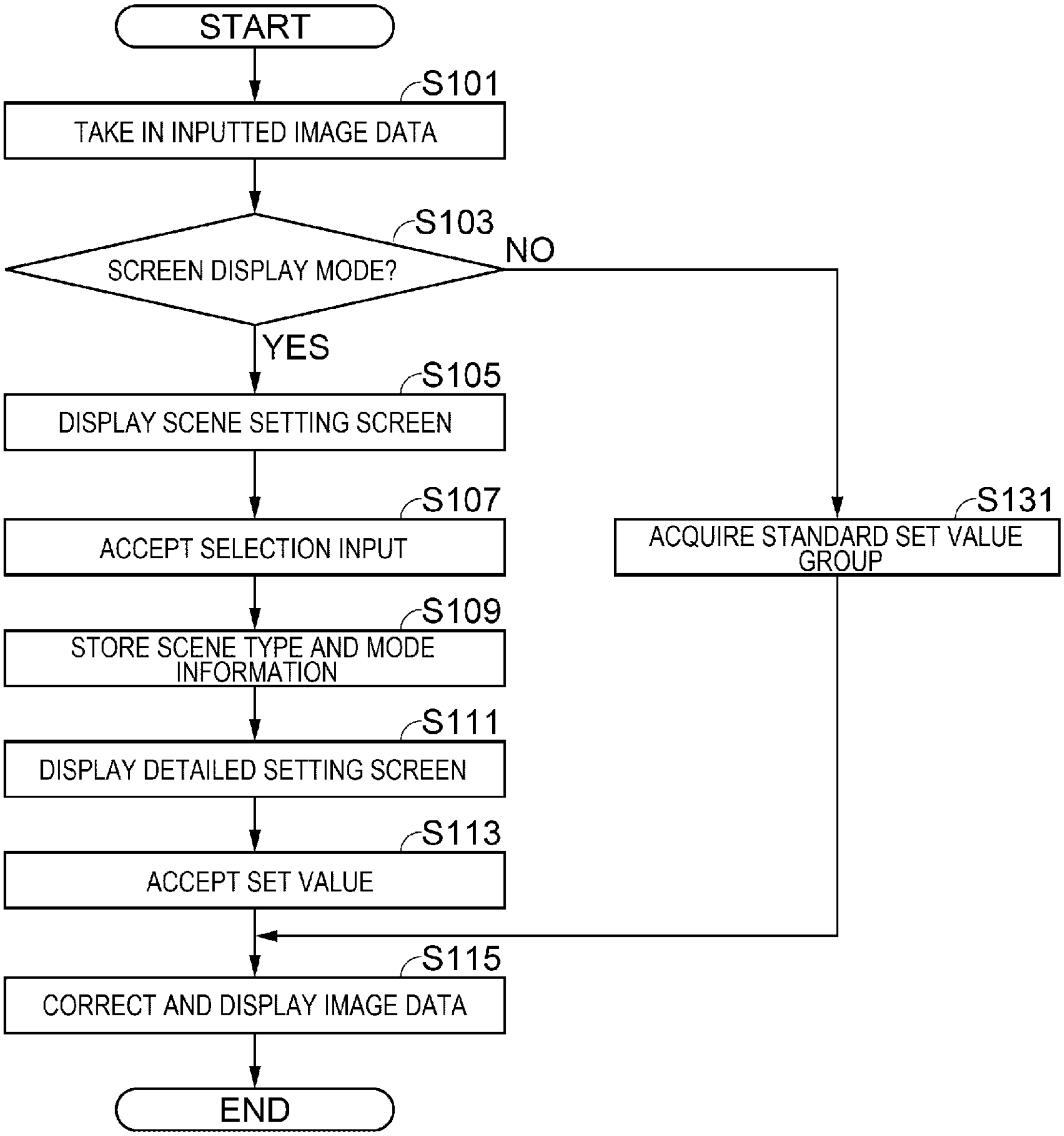
FIG. 4 is a flowchart related to a display method for a projector.

FIG. 4 shows a flowchart related to a display method for the projector 10. FIG. 4 shows a display method for displaying the first scene setting screen 100*a*, which is an example of the scene setting screen 100.

In step S101, the projector 10 takes in image data inputted from the image providing device 50. The communication interface 15 of the projector 10 communicatively connects to the communication unit 57 of the image providing device 50. The communication interface 15 takes in image data inputted from the communication unit 57. The communication interface 15 outputs the image data to the OSD control unit 23 of the control unit 21. The OSD control unit 23 takes in the image data inputted thereto.

When the image data is inputted to the projector 10, the projector 10 determines in step S103 whether the mode information represents the screen display mode or not. The mode information represents the screen display mode or the screen non-display mode. The mode information is preset before the image data is inputted. The mode information is stored in the memory 17. In initial settings, the screen display mode is preset in the projector 10. The initial settings are settings set at the time of the shipment of the projector 10 from the plant or when the projector 10 is reset.

When it is determined that the mode information represents the screen display mode, the OSD control unit 23 proceeds to step S105 (YES in step S103). When it is determined that the mode information does not represent the screen display mode, the OSD control unit 23 determines that the mode information represents the screen non-display mode. When it is determined that the mode information represents the screen non-display mode, the OSD control unit 23 proceeds to step S131 (NO in step S103).

When it is determined in step S103 that the mode information represents the screen non-display mode, the projector 10 acquires a standard set value group in step S131. The OSD control unit 23 reads out the standard set value group from the memory 17. The memory 17 stores the standard set value group in advance. The OSD control unit 23 outputs the standard set value group as a set value group to the image control unit 25. After the set value group is outputted to the image control unit 25, the projector 10 proceeds to step S115.

The screen non-display mode can be set when the scene setting screen 100 is displayed. When previous image data is inputted from the image providing device 50 before the image data is inputted from the image providing device 50, the user can set the screen non-display mode, using the scene setting screen 100.

In step S105, the projector 10 displays the first scene setting screen 100*a*. The OSD control unit 23 causes the projection unit 30 to project the first scene setting screen 100*a*, based on the scene setting screen data, and thus to display the first scene setting screen 100*a* on the projection surface SC. The projection unit 30 projects the first scene setting screen 100*a* onto the projection surface SC under the control of the OSD control unit 23.

Figure 5:
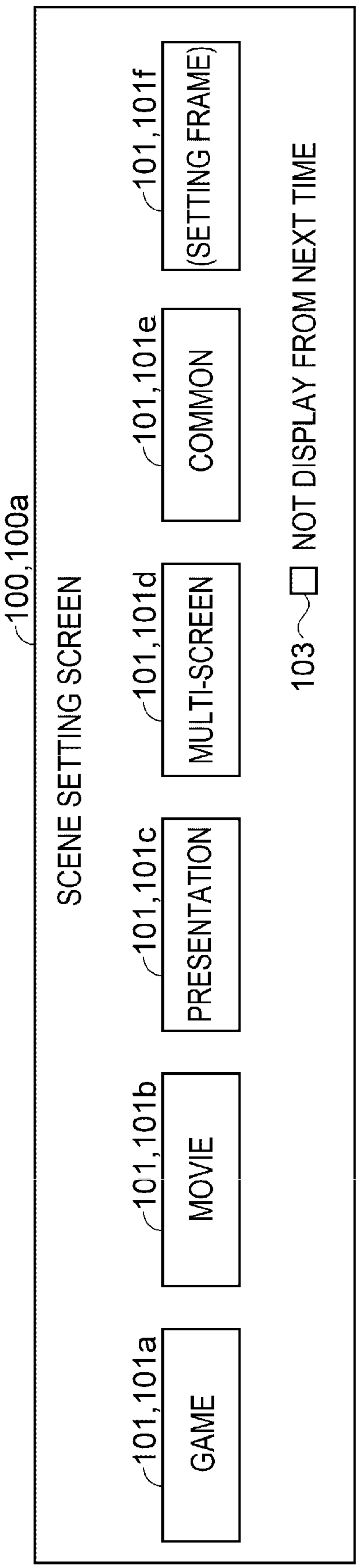
FIG. 5 shows a schematic configuration of a scene setting screen.

FIG. 5 shows a schematic configuration of the scene setting screen 100. FIG. 5 shows a schematic configuration of the first scene setting screen 100*a*, which is an example of the scene setting screen 100. The first scene setting screen 100*a* shown in FIG. 5 is displayed on the projection surface SC in step S105 in FIG. 4.

The first scene setting screen 100*a* displays a plurality of selection icons 101. Each of the plurality of selection icons 101 can accept a selection input, which is an operation input by the user. The user makes an operation input to the input button 13 on the operation panel 11 and thus can select a selection icon 101. The plurality of selection icons 101 are a game icon 101*a*, a movie icon 101*b*, a presentation icon 101*c*, a multi-screen icon 101*d*, a common icon 101*e*, and an icon yet to be set 101*f*. The number of the selection icons 101 displayed on the first scene setting screen 100*a* is not limited to six. The number of the selection icons 101 may be any number equal to or greater than two. The game, movie, presentation, and multi-screen represent scene types of the projection image PG projected by the projector 10.

The game icon 101*a* is an icon selected by the user when the image data is a game image. When the user has determined that the data image outputted from the image providing device 50 is a game image, the user makes a selection input to the game icon 101*a*. As the selection input to the game icon 101*a* is accepted, the game icon 101*a* is selected. The game icon 101*a* is an equivalent to an example of a first item image.

The movie icon 101*b* is an icon selected by the user when the image data is a movie image. When the user has determined that the data image outputted from the image providing device 50 is a movie image, the user makes a selection input to the movie icon 101*b*. As the selection input to the movie icon 101*b* is accepted, the movie icon 101*b* is selected. The movie icon 101*b* is an equivalent to an example of a second item image.

The presentation icon 101*c* is an icon selected by the user when the image data is a presentation image. When the user has determined that the data image outputted from the image providing device 50 is a presentation image, the user makes a selection input to the presentation icon 101*c*. As the selection input to the presentation icon 101*c* is accepted, the presentation icon 101*c* is selected.

The multi-screen icon 101*d* is an icon selected by the user when the image data is a multi-image showing a plurality of images on the same screen. When the user has determined that the data image outputted from the image providing device 50 is a multi-image, the user makes a selection input to the multi-screen icon 101*d*. As the selection input to the multi-screen icon 101*d* is accepted, the multi-screen icon 101*d* is selected.

The common icon 101*e* is an icon selected by the user when the image data is an image that is not discriminated by the scene type. When the user has determined that the data image outputted from the image providing device 50 is an image that is not discriminated by the scene type, the user makes a selection input to the common icon 101*e*. As the selection input to the common icon 101*e* is accepted, the common icon 101*e* is selected.

The icon yet to be set 101*f* is an icon on which the manager of the projector 10 can set a scene type. The icon yet to be set 101*f* can be set when the manager has configured a predetermined setting on the icon yet to be set 101*f*. It is shown that the icon yet to be set 101*f* cannot be selected by the user of the projector 10.

The first scene setting screen 100*a* displays a display setting field 103. The display setting field 103 accepts a switching operation input to switch from the screen display mode to the screen non-display mode. The screen non-display mode can be set when the first scene setting screen 100*a* is displayed. The display setting field 103 illustrated in FIG. 5 shows a state where no switching operation input is accepted. When the switching operation input to the display setting field 103 is accepted, the display form of the display setting field 103 is changed. In an example, a checkmark image is superimposed on the display setting field 103. The display setting field 103 is equivalent to an example of a switching input field. The switching operation input is equivalent to an example of switching input information.

The display method includes accepting an operation to set the screen non-display mode for not displaying the first scene setting screen 100*a*, when the first scene setting screen 100*a* is displayed.

The screen non-display mode can be selected when image data is inputted. When image data is inputted to the projector 10, the user can switch to the screen non-display mode for not displaying the first scene setting screen 100*a*.

Referring back to FIG. 4, after displaying the first scene setting screen 100*a*, the projector 10 in step S107 accepts a selection input from the user. The user operates the input button 13 on the operation panel 11 and thus makes a selection input. A selection input to one selection icon 101 of the plurality of selection icons 101 displayed on the first scene setting screen 100*a* shown in FIG. 5 is accepted. A switching operation input by the user to the display setting field 103 may be accepted.

When the selection input to the selection icon 101 is accepted, the projector 10 in step S109 accepts a scene type corresponding to the selection icon 101 accepted on the first scene setting screen 100*a*. The OSD control unit 23 accepts the scene type corresponding to selection icon 101. The OSD control unit 23 temporarily stores the scene type corresponding to the selection icon 101. The OSD control unit 23 may cause the memory 17 to store the scene type corresponding to the selection icon 101.

When the switching operation input to the display setting field 103 is accepted, the projector 10 in step S109 switches the mode information from the screen display mode to the screen non-display mode. The OSD control unit 23 causes the memory 17 to store the screen non-display mode as the mode information, based on the switching operation input. When no switching operation input to the display setting field 103 is accepted, the projector 10 in step S109 does not switch the mode information from the screen display mode to the screen non-display mode. The projector 10 maintains the screen display mode. The memory 17 continues storing the screen display mode as the mode information.

The first scene setting screen 100*a* has the display setting field 103 for accepting an operation to switch from the screen display mode to the screen non-display mode. In the display method, accepting the operation to set the screen non-display mode for not displaying the first scene setting screen 100*a* includes: accepting a switching operation input inputted to the display setting field 103 when the first scene setting screen 100*a* is displayed; and switching the screen display mode to the screen non-display mode, based on the switching operation input.

The screen non-display mode can be set when the first scene setting screen 100*a* is displayed. The user can select the screen non-display mode for not displaying the first scene setting screen 100*a* the next time image data is inputted from the image providing device 50.

After storing the scene type corresponding to the selection icon 101, the projector 10 in step S111 displays the detailed setting screen 110. The OSD control unit 23 transmits the detailed setting screen data to the projection unit 30. The OSD control unit 23 causes the detailed setting screen 110 to be projected onto the projection surface SC, based on the detailed setting screen data. The OSD control unit 23 causes the projection unit 30 to project the detailed setting screen 110 and thus to display the detailed setting screen 110 on the projection surface SC.

Figure 6:
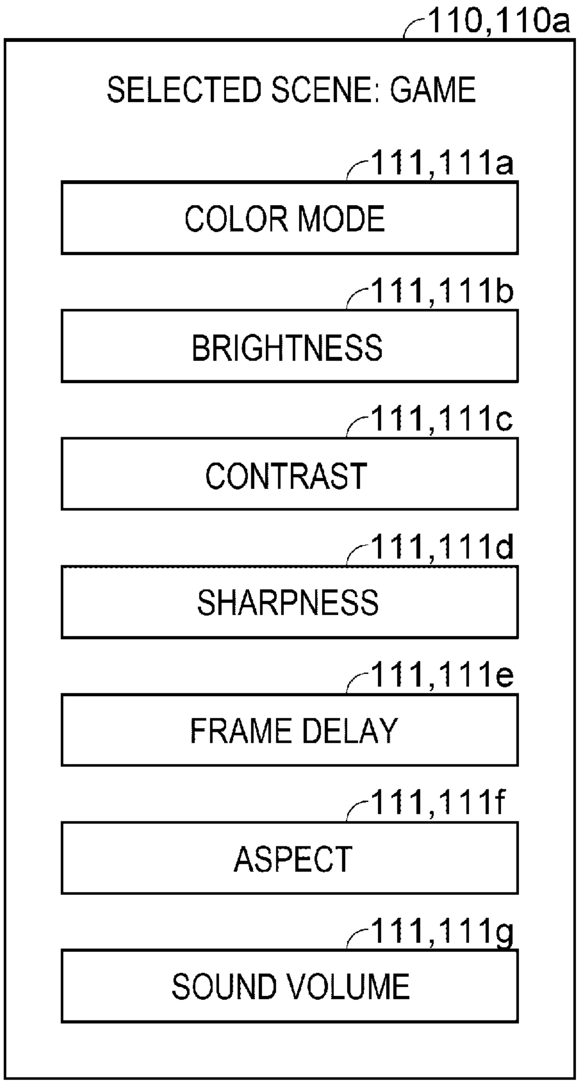
FIG. 6 shows a schematic configuration of a detailed setting screen.

FIG. 6 shows a schematic configuration of the detailed setting screen 110. FIG. 6 shows a first detailed setting screen 110*a*, which is an example of the detailed setting screen 110. The first detailed setting screen 110*a* is displayed when a selection input to the game icon 101*a* is accepted on the first scene setting screen 100*a*. The first detailed setting screen 110*a* corresponds to the game icon 101*a*. The first detailed setting screen 110*a* is equivalent to an example of a first display setting screen.

The first detailed setting screen 110*a* displays a plurality of setting icons 111. The first detailed setting screen 110*a* displays a color mode setting icon 111*a*, a brightness setting icon 111*b*, a contrast setting icon 111*c*, a sharpness setting icon 111*d*, a frame delay setting icon 111*e*, an aspect setting icon 111*f*, and a sound volume setting icon 111*g*. The number of the setting icons 111 displayed on the detailed setting screen 110 is not limited to seven. The number of the setting icons 111 may be any number equal to or greater than one. The setting icons 111 include an icon related to image adjustment. The color mode setting icon 111*a*, the brightness setting icon 111*b*, the contrast setting icon 111*c*, the sharpness setting icon 111*d*, the frame delay setting icon 111*e*, and the aspect setting icon 111*f* are related to image adjustment. The setting icon 111 corresponds a setting item. The color mode, brightness, contrast, sharpness, frame delay, aspect, and sound volume are setting items.

The control unit 21 stores an initial set value of the setting item corresponding to the setting icon 111 displayed on the detailed setting screen 110. When a plurality of setting icons 111 are displayed, the control unit 21 reads out an initial set value group including the initial set value of the setting item corresponding to each setting icon 111. The initial set value group is a set of the initial set values corresponding to the individual setting icons 111 and stored as the initial set value group in the memory 17 in advance. The initial set value group is set for each scene type selected on the scene setting screen 100. The detailed setting screen 110 is an operation screen set for each scene type. The control unit 21 reads out, from the memory 17, the initial set value group of the scene type corresponding to the detailed setting screen 110 that is displayed. The detailed setting screen 110 is a screen where a change in the initial set value of the setting item corresponding to the setting icon 111 can be accepted. When the first detailed setting screen 110*a* is displayed, the control unit 21 reads out the initial set value corresponding to each of the plurality of setting icons 111. The initial set value group that is read out is an initial game set value group for the game scene, which is the scene type corresponding to the game icon 101*a*. The initial game set value group is an example of a plurality of initial set value groups.

The color mode setting icon 111*a* is an icon selected when the user sets a color mode. When the user sets the color mode, the user makes an operation input to the color mode setting icon 111*a*. As the user makes the operation input to the color mode setting icon 111*a*, the color mode setting icon 111*a* is selected. The color mode is an item related to the setting of the brightness, contrast, and color balance of the projection image PG. The color mode is a dynamic mode, a vivid mode, a natural mode or the like. In an example, when the game icon 101*a* is selected on the first scene setting screen 100*a*, the dynamic mode is read out from the memory 17 as the initial set value of the color mode. When the color mode setting icon 111*a* is selected, the user can change the dynamic mode, which is the initial set value, to another set value. When the user has changed the initial set value to another set value, the OSD control unit 23 acquires the changed set value as the set value of the color mode. When the user does not change the initial set value, the OSD control unit 23 acquires the initial set value as the set value of the color mode. The color mode setting icon 111*a* is equivalent to an example of an item display field. The set value of the color mode is equivalent to an example of an item set value.

The brightness setting icon 111*b* is an icon selected when the user sets the brightness of the projection image PG. When the user sets the brightness of the projection image PG, the user makes an operation input to the brightness setting icon 111*b*. As the user makes the operation input to the brightness setting icon 111*b*, the brightness setting icon 111*b* is selected. The brightness of the projection image PG is expressed by a numerical value or the like. When the game icon 101*a* is selected on the first scene setting screen 100*a*, the initial set value of the brightness included in the initial set value group corresponding to the game scene is read out from the memory 17. When the brightness setting icon 111*b* is selected, the user can change the initial set value of the brightness to another set value. When the user has changed the initial set value to another set value, the OSD control unit 23 acquires the changed set value as the set value of the brightness. When the user does not change the initial set value, the OSD control unit 23 acquires the initial set value as the set value of the brightness. The brightness setting icon 111*b* is equivalent to an example of the item display field. The set value of the brightness is equivalent to an example of the item set value.

The contrast setting icon 111*c* is an icon selected when the user sets the contrast of the projection image PG. When the user sets the contrast of the projection image PG, the user makes an operation input to the contrast setting icon 111*c*. As the user makes the operation input to the contrast setting icon 111*c*, the contrast setting icon 111*c* is selected. The contrast of the projection image PG is expressed by a numerical value or the like. When the game icon 101*a* is selected on the first scene setting screen 100*a*, the initial set value of the contrast included in the initial set value group corresponding to the game scene is read out from the memory 17. When the contrast setting icon 111*c* is selected, the user can change the initial set value of the contrast to another set value. When the user has changed the initial set value to another set value, the OSD control unit 23 acquires the changed set value as the set value of the contrast. When the user does not change the initial set value, the OSD control unit 23 acquires the initial set value as the set value of the contrast. The contrast setting icon 111*c* is equivalent to an example of the item display field. The set value of the contrast is equivalent to an example of the item set value.

The sharpness setting icon 111*d* is an icon selected when the user sets the sharpness of the projection image PG. When the user sets the way the contour of the projection image PG looks, the user makes an operation input to the sharpness setting icon 111*d*. As the user makes the operation input to the sharpness setting icon 111*d*, the sharpness setting icon 111*d* is selected. The sharpness of the projection image PG is expressed by a numerical value or the like. When the game icon 101*a* is selected on the first scene setting screen 100*a*, the initial set value of the sharpness included in the initial set value group corresponding to the game scene is read out from the memory 17. When the sharpness setting icon 111*d* is selected, the user can change the initial set value to another set value. When the user has changed the initial set value to another set value, the OSD control unit 23 acquires the changed set value as the set value of the sharpness. When the user does not change the initial set value, the OSD control unit 23 acquires the initial set value as the set value of the sharpness. The sharpness setting icon 111*d* is equivalent to an example of the item display field. The set value of the sharpness is equivalent to an example of the item set value.

The frame delay setting icon 111*e* is an icon selected when the user sets the frame delay when displaying the projection image PG. When the user sets the frame delay, the user makes an operation input to the frame delay setting icon 111*e*. As the user makes the operation input to the frame delay setting icon 111*e*, the frame delay setting icon 111*e* is selected. The frame delay to be set is a low delay mode, a high image quality mode or the like. In an example, when the game icon 101*a* is selected on the first scene setting screen 100*a*, the low delay mode is read out from the memory 17 as the initial set value of the frame delay. When the frame delay setting icon 111*e* is selected, the user can change the initial set value to another set value. When the user has changed the initial set value to another set value, the OSD control unit 23 acquires the changed set value as the set value of the frame delay. When the user does not change the initial set value, the OSD control unit 23 acquires the initial set value as the set value of the frame delay. The frame delay setting icon 111*e* is equivalent to an example of the item display field. The set value of the frame delay is equivalent to an example of the item set value.

The aspect setting icon 111*f* is an icon selected when the user sets the aspect ratio of the projection image PG. When the user sets the aspect ratio of the projection image PG, the user makes an operation input to the aspect setting icon 111*f*. As the user makes the operation input to the aspect setting icon 111*f*, the aspect setting icon 111*f* is selected. The aspect ratio to be set is 4:3, 16:10, 16:9 or the like. In an example, when the game icon 101*a* is selected on the first scene setting screen 100*a*, the 16:9 is read out from the memory 17 as the initial set value of the aspect ratio. When the aspect setting icon 111*f* is selected, the user can change the initial set value to another set value. When the user has changed the initial set value to another set value, the OSD control unit 23 acquires the changed set value as the set value of the aspect ratio. When the user does not change the initial set value, the OSD control unit 23 acquires the initial set value as the set value of the aspect ratio. The aspect setting icon 111*f* is equivalent to an example of the item display field. The set value of the aspect ratio is equivalent to an example of the item set value.

The sound volume setting icon 111*g* is an icon selected when the user sets the sound volume when displaying the projection image PG. When the user sets the sound volume, the user makes an operation input to the sound volume setting icon 111*g*. As the user makes the operation input to the sound volume setting icon 111*g*, the sound volume setting icon 111*g* is selected. The sound volume is expressed by a numerical value or the like. When the game icon 101*a* is selected on the first scene setting screen 100*a*, the initial set value of the sound volume included in the initial set value group corresponding to the game scene is read out from the memory 17. When the sound volume setting icon 111*g* is selected, the user can change the initial sound volume set value to another set value. When the user has changed the initial set value to another set value, the OSD control unit 23 acquires the changed set value as the set value of the sound volume. When the user does not change the initial set value, the OSD control unit 23 acquires the initial set value as the set value of the sound volume.

Figure 7:
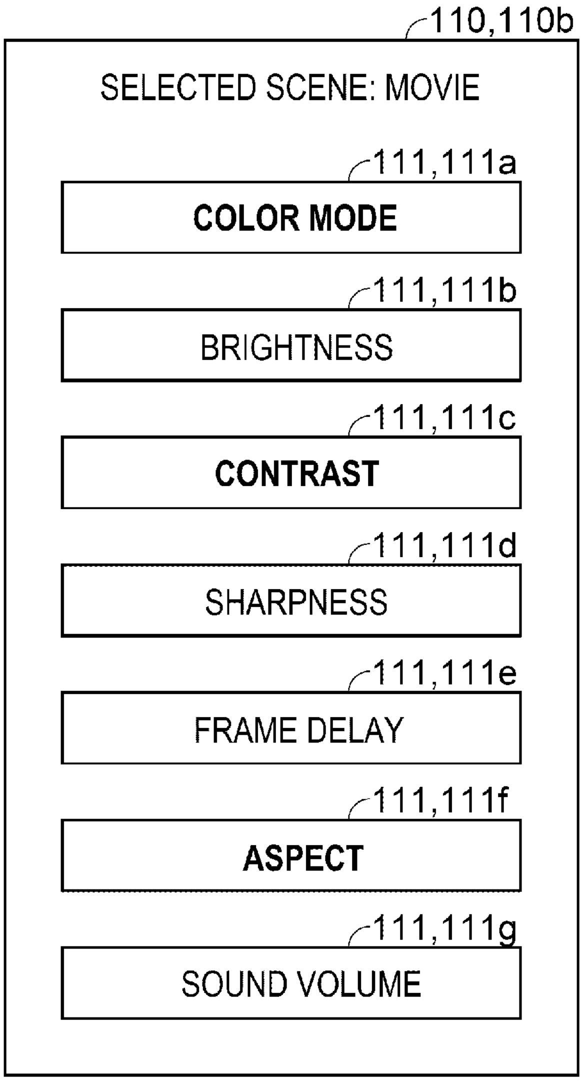
FIG. 7 shows a schematic configuration of the detailed setting screen.

FIG. 7 shows a schematic configuration of the detailed setting screen 110. FIG. 7 shows a second detailed setting screen 110*b*, which is an example of the detailed setting screen 110. The second detailed setting screen 110*b* is displayed when a selection input to the movie icon 101*b* is accepted on the first scene setting screen 100*a*. The second detailed setting screen 110*b* corresponds to the movie icon 101*b*. The second detailed setting screen 110*b* is equivalent to an example of a second display setting screen.

The detailed setting screen 110 corresponding to each of the plurality of selection icons 101 included in the scene setting screen 100 is preset. The detailed setting screens 110 corresponding to the individual selection icons 101 may be configured to have the same display content or may be configured to have different display contents from each other. Preferably, the detailed setting screens 110 corresponding to the selection icons 101 may be configured to have different display contents from each other. The second detailed setting screen 110*b* shown in FIG. 7 is in a different display form from the first detailed setting screen 110*a* shown in FIG. 6.

The second detailed setting screen 110*b* displays a plurality of setting icons 111. The second detailed setting screen 110*b* displays a color mode setting icon 111*a*, a brightness setting icon 111*b*, a contrast setting icon 111*c*, a sharpness setting icon 111*d*, a frame delay setting icon 111*e*, an aspect setting icon 111*f*, and a sound volume setting icon 111*g*. The plurality of setting icons 111 displayed on the second detailed setting screen 110*b* are the same as the plurality of setting icons 111 displayed on the first detailed setting screen 110*a* and have the same functions.

The color mode setting icon 111*a*, the contrast setting icon 111*c*, and the aspect setting icon 111*f* included in the second detailed setting screen 110*b* are displayed in a different display form from the setting icons 111 included in the first detailed setting screen 110*a*. The color mode setting icon 111*a*, the contrast setting icon 111*c*, and the aspect setting icon 111*f* included in the second detailed setting screen 110*b* are highlighted. The color mode setting icon 111*a*, the contrast setting icon 111*c*, and the aspect setting icon 111*f* are the setting icons 111 related to items whose initial set value is likely to be changed by the user. As a predetermined setting icon 111 of the plurality of setting icons 111 is highlighted, the user can more easily check the highlighted setting icon 111.

The second detailed setting screen 110*b* shown in FIG. 7 is configured to have a different display form from the first detailed setting screen 110*a* shown in FIG. 6 but is not limited to this configuration. The second detailed setting screen 110*b* may be configured to have a different display order from the display order of the plurality of setting icons 111 in the first detailed setting screen 110*a*.

The control unit 21 reads out, from the memory 17, the initial set value corresponding to the setting icon 111 displayed on the detailed setting screen 110. The control unit 21 reads out, from the memory 17, the initial set value group including the initial set value corresponding to each setting icon 111. When the second detailed setting screen 110*b* is displayed, the control unit 21 reads out the initial set value group including the initial set value corresponding to each of the plurality of setting icons 111. The initial set value group that is read out is the initial set value group of the movie scene, which is the scene type corresponding to the movie icon 101*b*.

Referring back to FIG. 4, after displaying the detailed setting screen 110, the projector 10 in step S113 accepts a set value corresponding to the setting icon 111. The user makes an operation input to one setting icon 111, of the plurality of setting icons 111 included in the detailed setting screen 110. The OSD control unit 23 accepts the operation input to the one setting icon 111. When the one setting icon 111 is selected, the user can change the initial set value of the setting item corresponding to the one setting icon 111 to another set value. When the user has changed the initial set value to another set value, the OSD control unit 23 acquires the changed set value as the set value of the setting item. When the user does not change the initial set value, the OSD control unit 23 acquires the initial set value as the set value of the setting item.

When the user has made an operation input to the decision button, which is the input button 13 included in the operation panel 11, the OSD control unit 23 acquires the set value of the setting item corresponding to the setting icon 111. When the user has changed the set values of setting items corresponding to a plurality of setting icons 111, the OSD control unit 23 acquires a set value group formed of a set of the set values of the plurality of setting items. The OSD control unit 23 outputs the acquired set value group to the image control unit 25.

After accepting the set value, the projector 10 in step S115 corrects the image data and displays the corrected image data that is corrected. The image control unit 25 acquires the set value group from the OSD control unit 23. The image control unit 25 corrects the image data, using the set value group. The image control unit 25 outputs the image data that is corrected, as corrected image data, to the projection unit 30. The projection unit 30 projects the projection image PG onto the projection surface SC, based on the corrected image data. The image control unit 25 causes the projection unit 30 to project the projection image PG based on the corrected image data and thus to display the projection image PG on the projection surface SC.

In FIG. 4, the detailed setting screen 110 is displayed in step S111 after the mode information is stored in step S109. However, this configuration is not limiting. When a selection input to the selection icon 101 is accepted, the OSD control unit 23 may acquire the initial set value group corresponding to the selected scene type and may output the initial set value group to the image control unit 25. The image control unit 25 corrects the image data, using the acquired initial set value group. The image control unit 25 causes the projection unit 30 to project the projection image PG, based on the corrected image data that is corrected.

The display method includes: presetting the screen display mode for displaying the scene setting screen 100; accepting an input of image data from the image providing device 50; and displaying the scene setting screen 100, when the image data is inputted and it is determined that the image display mode is in operation.

Since the screen display mode is preset, the scene setting screen 100 is displayed regardless of the scene type of the image data when the image data is inputted. The user of the projector 10 can recognize that a setting related to image adjustment can be made. The projector 10 can display the scene setting screen 100 to a user who is not very familiar with user settings.

The display method includes: not displaying the scene setting screen 100 when the image data is inputted after the screen display mode is switched to the screen non-display mode.

If the screen non-display mode is set as the mode information when the scene setting screen 100 is displayed, the scene setting screen 100 is not displayed the next time the user inputs the image data from the image providing device 50. The user need not check the scene setting screen 100 every time the user inputs the image data from the image providing device 50.

The first scene setting screen 100*a* includes the game icon 101*a* and the movie icon 101*b*. The display method includes: displaying the first detailed setting screen 110*a* corresponding to the game icon 101*a* when a selection input to the game icon 101*a* is accepted; and displaying the second detailed setting screen 110*b* corresponding to the movie icon 101*b* when a selection input to the movie icon 101*b* is accepted.

The detailed setting screen 110 for each selected selection icon 101 is displayed. The user can set the set values of various setting items, using the detailed setting screen 110 for each scene type.

The first detailed setting screen 110*a* includes the setting icon 111 related to image adjustment. The display method includes: accepting the set value corresponding to the setting icon 111 when the first detailed setting screen 110*a* is displayed; and displaying the projection image PG based on the image data corrected based on the set value.

The image correction of the projection image PG can be made, based on the set value inputted using the first detailed setting screen 110*a*.

The projector 10 has: the communication interface 15 accepting an input of image data outputted from the image providing device 50; the control unit 21 executing presetting the screen display mode for displaying the scene setting screen 100, and displaying the scene setting screen 100, when the image data is inputted to the communication interface 15 and it is determined that the screen display mode is in operation; and the projection unit 30 displaying the scene setting screen 100 under the control of the control unit 21.

Since the screen display mode is preset, the scene setting screen 100 is displayed regardless of the scene type of the image data when the image data is inputted. The projector 10 can display the scene setting screen 100 to a user who is not very familiar with user settings. The user of the projector 10 can recognize that a setting related to image adjustment can be made.

The operation panel 11 or the remote controller for accepting an operation to set the screen non-display mode for not displaying the scene setting screen when the projection unit 30 displays the scene setting screen 100, is provided.

The user, using the operation panel 11 or the remote controller, can select the screen non-display mode for not displaying the scene setting screen 100 when the image data is inputted.

Second Embodiment

A second embodiment represents a display method for displaying a scene setting screen 100 that is different from the scene setting screen 100 in the first embodiment. The second embodiment represents a display method for displaying a second scene setting screen 100*b*, which is an example of the scene setting screen 100.

Figure 8:
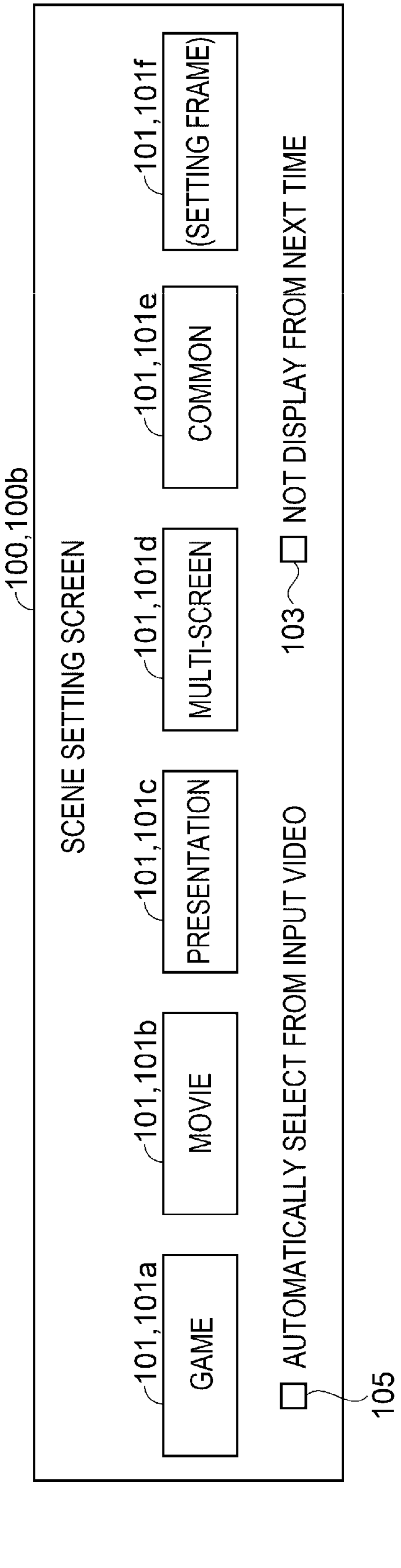
FIG. 8 shows a schematic configuration of the scene setting screen.

FIG. 8 shows a schematic configuration of the scene setting screen 100. FIG. 8 shows a schematic configuration of the second scene setting screen 100*b*, which is an example of the scene setting screen 100. The display content of the second scene setting screen 100*b* is different from the display content of the first scene setting screen 100*a*.

The second scene setting screen 100*b* displays a plurality of selection icons 101. Each of the plurality of selection icons 101 can accept a selection input, which is an operation input by the user. The user makes an operation input to the input button 13 on the operation panel 11 and thus can select a selection icon 101. The plurality of selection icons 101 are a game icon 101*a*, a movie icon 101*b*, a presentation icon 101*c*, a multi-screen icon 101*d*, a common icon 101*e*, and an icon yet to be set 101*f*. The plurality of selection icons 101 displayed on the second scene setting screen 100*b* are the same as the plurality of selection icons 101 displayed on the first scene setting screen 100*a*. The plurality of selection icons 101 displayed on the second scene setting screen 100*b* may be the same as or different from the plurality of selection icons 101 displayed on the first scene setting screen 100*a*. The number of the selection icons 101 displayed on the second scene setting screen 100*b* is not limited to six. The number of the selection icons 101 may be any number equal to or greater than two.

The second scene setting screen 100*b* displays a display setting field 103. The display setting field 103 accepts a switching operation input to switch from the screen display mode to the screen non-display mode. The screen non-display mode can be set when the second scene setting screen 100*b* is displayed. The display setting field 103 displayed on the second scene setting screen 100*b* is the same as the display setting field 103 displayed on the first scene setting screen 100*a*. The display setting field 103 illustrated in FIG. 8 shows a state where no switching operation input is accepted. When the switching operation input to the display setting field 103 is accepted, the display form of the display setting field 103 is changed. In an example, a checkmark image is superimposed on the display setting field 103.

The second scene setting screen 100*b* displays an automatic selection field 105. The automatic selection field 105 accepts a change input to apply an automatic scene setting in which the control unit 21 automatically adjusts the projection image PG. The automatic scene setting is equivalent to an example of an automatic setting. The automatic scene setting can be set when the second scene setting screen 100*b* is displayed. The user switches whether to apply the automatic scene setting or not, using the automatic selection field 105. When the user has made a change input to apply the automatic scene setting to the automatic selection field 105, the control unit 21 accepts the change input. The automatic selection field 105 illustrated in FIG. 8 shows a state where no change input is accepted. When the change input to the automatic selection field 105 is accepted, the display form of the automatic selection field 105 is changed. In an example, a checkmark image is superimposed on the automatic selection field 105. The automatic selection field 105 is equivalent to an example of an automatic setting field. The change input is equivalent to an example of automatic setting information.

Figure 9:
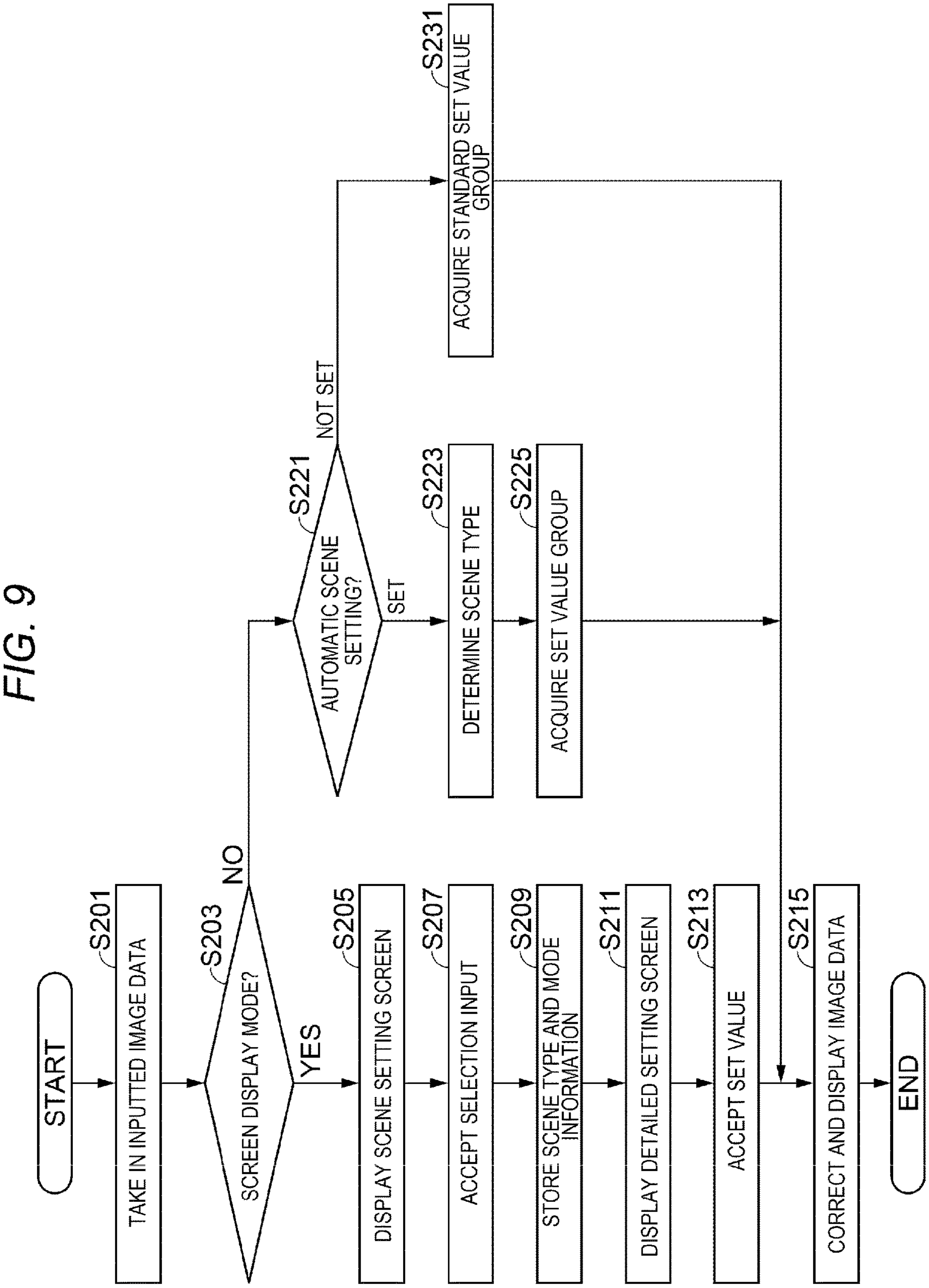
FIG. 9 is a flowchart related to a display method for the projector.

FIG. 9 shows a flowchart related to a display method for the projector 10. FIG. 9 shows a display method for displaying the second scene setting screen 100*b*, which is an example of the scene setting screen 100.

In step S201, the projector 10 takes in image data inputted from the image providing device 50. The communication interface 15 of the projector 10 communicatively connects to the communication unit 57 of the image providing device 50. The communication interface 15 takes in image data inputted from the communication unit 57. The communication interface 15 outputs the image data to the OSD control unit 23 of the control unit 21. The OSD control unit 23 takes in the image data inputted thereto.

When the image data is inputted to the projector 10, the projector 10 determines in step S203 whether the mode information represents the screen display mode or not. The mode information represents the screen display mode or the screen non-display mode. The mode information is preset before the image data is inputted. The mode information is stored in the memory 17. In initial settings, the screen display mode is preset in the projector 10.

When it is determined that the mode information represents the screen display mode, the OSD control unit 23 proceeds to step S205 (YES in step S203). When it is determined that the mode information does not represent the screen display mode, the OSD control unit 23 determines that the mode information represents the screen non-display mode. When it is determined that the mode information represents the screen non-display mode, the OSD control unit 23 proceeds to step S221 (NO in step S203).

In step S205, the projector 10 displays the second scene setting screen 100*b*. The OSD control unit 23 causes the projection unit 30 to project the second scene setting screen 100*b*, based on the scene setting screen data, and thus to display the second scene setting screen 100*b* on the projection surface SC. The projection unit 30 projects the second scene setting screen 100*b* onto the projection surface SC under the control of the OSD control unit 23.

After displaying the second scene setting screen 100*b*, the projector 10 in step S207 accepts a selection input from the user. The user operates the input button 13 on the operation panel 11 and thus makes a selection input. A selection input to one selection icon 101 of the plurality of selection icons 101 displayed on the second scene setting screen 100*b* shown in FIG. 8 is accepted. A switching operation input by the user to the display setting field 103 may be accepted. Also, a change input by the user to the automatic selection field 105 may be accepted.

When the change input to the automatic selection field 105 is accepted, the display form of the display setting field 103 may be changed. When the change input to the automatic selection field 105 is accepted, the display setting field 103 is changed to the display form as of when the switching operation input is accepted. The change input to the automatic selection field 105 includes the switching operation input to the display setting field 103. The change input to the automatic selection field 105 is linked to the switching operation input to the display setting field 103.

When the operation input to the selection icon 101 is accepted, the projector 10 in step S209 accepts a scene type corresponding to the selection icon 101 accepted on the second scene setting screen 100*b*. The OSD control unit 23 accepts the scene type corresponding to selection icon 101. The OSD control unit 23 temporarily stores the scene type corresponding to the selection icon 101. The OSD control unit 23 may cause the memory 17 to store the scene type corresponding to the selection icon 101.

When the switching operation input to the display setting field 103 is accepted, the projector 10 in step S209 switches from the screen display mode to the screen non-display mode. The OSD control unit 23 causes the memory 17 to store the screen non-display mode as the mode information, based on the switching operation input. When no switching operation input to the display setting field 103 is accepted, the projector 10 in step S209 does not switch the mode information from the screen display mode to the screen non-display mode. The projector 10 maintains the screen display mode. The memory 17 continues storing the screen display mode as the mode information.

When the change input to the automatic selection field 105 is accepted, the projector 10 in step S209 changes to the automatic scene setting. The OSD control unit 23 causes the memory 17 to store the automatic scene setting, based on the change input. When the change input to the automatic selection field 105 is accepted, the projector 10 switches the mode information from the screen display mode to the screen non-display mode. The OSD control unit 23 causes the memory 17 to store the screen non-display mode as the mode information, based on the change input. When no change input to the automatic selection field 105 is accepted, the projector 10 in step S209 does not change to the automatic scene setting.

After storing the scene type corresponding to the selection icon 101, the projector 10 in step S211 displays the detailed setting screen 110. The OSD control unit 23 transmits the detailed setting screen data to the projection unit 30. The OSD control unit 23 causes the detailed setting screen 110 to be projected onto the projection surface SC, based on the detailed setting screen data. The OSD control unit 23 causes the projection unit 30 to project the detailed setting screen

110 and thus to display the detailed setting screen 110 on the projection surface SC. The detailed setting screen 110 that is displayed is the first detailed setting screen 110*a* shown in FIG. 6, or the like.

After displaying the detailed setting screen 110, the projector 10 in step S213 accepts a set value corresponding to the setting icon 111. The user makes an operation input to one setting icon 111, of the plurality of setting icons 111 included in the detailed setting screen 110. The OSD control unit 23 accepts the operation input to the one setting icon 111. When the one setting icon 111 is selected, the user can change the initial set value of the setting item corresponding to the one setting icon 111 to another set value. When the user has changed the initial set value to another set value, the OSD control unit 23 acquires the changed set value as the set value of the setting item. When the user does not change the initial set value, the OSD control unit 23 acquires the initial set value as the set value of the setting item.

When the user has made an operation input to the decision button, which is the input button 13 included in the operation panel 11, the OSD control unit 23 acquires the set value of the setting item corresponding to the setting icon 111. When the user has changed the set values of setting items corresponding to a plurality of setting icons 111, the OSD control unit 23 acquires a set value group formed of a set of the set values of the plurality of setting items. The OSD control unit 23 outputs the acquired set value group to the image control unit 25.

After accepting the set value, the projector 10 in step S215 corrects the image data and displays the corrected image data that is corrected. The image control unit 25 acquires the set value group from the OSD control unit 23. The image control unit 25 corrects the image data, using the set value group. The image control unit 25 outputs the image data that is corrected, as corrected image data, to the projection unit 30. The projection unit 30 projects the projection image PG onto the projection surface SC, based on the corrected image data. The image control unit 25 causes the projection unit 30 to project the projection image PG based on the corrected image data and thus to display the projection image PG on the projection surface SC.

In FIG. 9, the detailed setting screen 110 is displayed in step S211 after the mode information is stored in step S209. However, this configuration is not limiting. When a selection input to the selection icon 101 is accepted, the OSD control unit 23 may acquire the initial set value group corresponding to the selected scene type and may output the initial set value group to the image control unit 25. The image control unit 25 corrects the image data, using the acquired initial set value group. The image control unit 25 causes the projection unit 30 to project the projection image PG, based on the corrected image data that is corrected.

When it is determined in step S203 that the mode information represents the screen non-display mode, the projector 10 proceeds to step S221 (NO in step S203). In step S221, the projector 10 determines whether the automatic scene setting is applied or not. When it is determined that the automatic scene setting is stored in the memory 17, the control unit 21 proceeds to step S223 (SET in step S221). When it is determined that the automatic scene setting is not stored in the memory 17, the control unit 21 proceeds to step S231 (NOT SET in step S221).

In step S223, the projector 10 determines the scene type of the image data. The control unit 21 analyzes the image data and thus determines the scene type based on the image data. The control unit 21 analyzes an image pattern or the like included in the image data and thus determines the scene type. The scene type is game, movie, presentation, multi-screen or the like. The scene type is equivalent to an example of an image type.

After determining the scene type, the projector 10 in step S225 acquires a set value group. The OSD control unit 23 acquires the initial set value group that is set or each scene type stored in the memory 17. The memory 17 stores the initial set value group corresponding to the scene type. The memory 17 stores the initial set value group corresponding to the game scene, the initial set value group corresponding to the movie scene, and the like. The OSD control unit 23 acquires the initial set value group and outputs the initial set value group as a set value group to the image control unit 25. The projector 10 proceeds to step S215.

When it is determined in step S221 that the automatic scene setting is not applied, the projector 10 proceeds to step S231 (NOT SET in step S221). In step S231, the projector 10 acquires a standard set value group. The OSD control unit 23 reads out the standard set value group from the memory 17. The OSD control unit 23 outputs the standard set value group as a set value group to the image control unit 25. The projector 10 proceeds to step S215.

The second scene setting screen 100*b* has the automatic selection field 105 for switching whether or not to apply the automatic scene setting to automatically adjust the projection image PG displayed based on the image data. The display method includes: accepting a change input to the automatic selection field 105 when the second scene setting screen 100*b* is displayed; and switching the screen display mode to the screen non-display mode when the change input indicates that the automatic scene setting is to be applied.

When the automatic scene setting is applied, the second scene setting screen 100*b* is not displayed. When the automatic scene setting is applied, the user may not view the second scene setting screen 100*b*.

The display method further includes determining the scene type based on the image data, when the image data is inputted and it is determined that the automatic scene setting is applied.

When the automatic scene setting is applied, the scene type based on the image data is determined. Therefore, the set value group corresponding to the scene type can be set.

Third Embodiment

Figure 10:
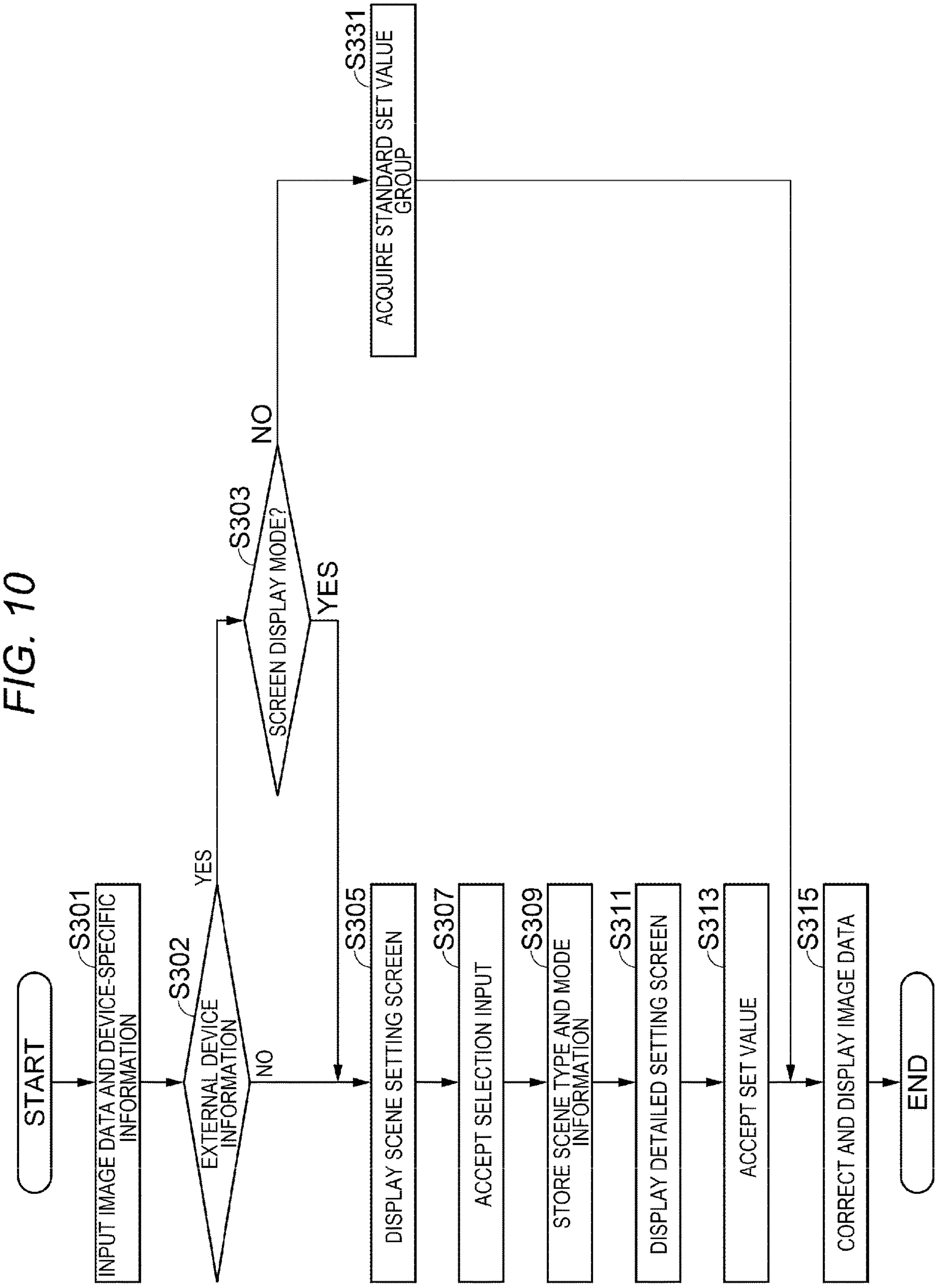
FIG. 10 is a flowchart related to a display method for the projector.

A third embodiment represents a display method that is different from the display methods in the first and second embodiments. The third embodiment represents a display method for the projector 10 in which the external device information 19 of the image providing device 50 and the mode information are stored in association with each other. The external device information 19 corresponds to the device-specific information 53 of the image providing device 50. FIG. 10 shows a flowchart related to a display method for the projector 10. FIG. 10 shows a display method for the projector 10 in which the external device information 19 of the image providing device 50 and the mode information are stored in association with each other.

In step S301, the projector 10 takes in image data and the device-specific information 53 inputted from the image providing device 50. The communication interface 15 of the projector 10 communicatively connects to the communication unit 57 of the image providing device 50. The communication interface 15 takes in image data and the device-specific information 53 inputted from the communication unit 57. The device-specific information 53 is added to the image data and thus outputted from the image providing device 50. When communicatively connected to the projector 10, the image providing device 50 may output the device-specific information 53 separately from the image data to the projector 10. The communication interface 15 outputs the image data to the OSD control unit 23 of the control unit 21. The OSD control unit 23 takes in the image data inputted thereto.

After taking in the image data and the device-specific information 53, the projector 10 in step S302 determines whether the external device information 19 corresponding to the device-specific information 53 is stored in the memory 17 or not. The memory 17 stores the external device information 19 and the mode information in association with each other. The memory 17 stores the external device information 19 and the screen display mode in association with each other. Alternatively, the memory 17 stores the external device information 19 and the screen non-display mode in association with each other. When the device-specific information 53 is inputted to the communication interface 15, the memory 17 stores the external device information 19 as information corresponding to the device-specific information 53. When the image providing device 50 outputs image data to the projector 10 for the first time, the memory 17 stores the external device information 19 corresponding to the device-specific information 53, and the screen display mode, which is the initial setting, in association with each other. When the user sets the screen non-display mode using the scene setting screen 100, the memory 17 stores the external device information 19 corresponding to the device-specific information 53 of the image providing device 50 outputting the image data, and the screen non-display mode, in association with each other.

The OSD control unit 23 determines whether the external device information 19 corresponding to the device-specific information 53 is stored in the memory 17 or not. When the external device information 19 is not stored in the memory 17, the OSD control unit 23 proceeds to step S305 (NO in step S302). When the image providing device 50 outputs image data to the projector 10 for the first time, the external device information 19 corresponding to the device-specific information 53 is not stored in the memory 17. After the memory 17 stores the external device information 19 and the screen display mode in association with each other, the projector 10 proceeds to step S305. When the external device information 19 corresponding to the device-specific information 53 is stored in the memory 17, the OSD control unit 23 proceeds to step S303 (YES in step S302).

When it is determined that the external device information 19 is stored, the projector 10 in step S303 determines whether the mode information associated with the external device information 19 is the screen display mode or not. Once the image providing device 50 is connected to the projector 10, the external device information 19 corresponding to the device-specific information 53 is stored in the memory 17. When it is determined that the external device information 19 and the screen display mode are stored in association with each other in the memory 17, the OSD control unit 23 proceeds step S305 (YES in step S303). When it is determined that the external device information 19 and the screen non-display mode are stored in association with each other in the memory 17, the OSD control unit 23 proceeds to step S331 (NO in step S303). When proceeding to step S331, the OSD control unit 23 does not display the first scene setting screen 100*a*.

When it is determined in step S303 that the mode information represents the screen non-display mode, the projector 10 acquires a standard set value group in step S331. The OSD control unit 23 reads out the standard set value group from the memory 17. The OSD control unit 23 outputs the standard set value group as a set value group to the image control unit 25. The projector 10 proceeds to step S315.

In step S305, the projector 10 displays the first scene setting screen 100*a*. The OSD control unit 23 causes the projection unit 30 to project the first scene setting screen 100*a*, based on the scene setting screen data, and thus to display the first scene setting screen 100*a* on the projection surface SC. The projection unit 30 projects the first scene setting screen 100*a* onto the projection surface SC under the control of the OSD control unit 23. The projector 10 in step S305 displays the first scene setting screen 100*a* but is not limited to this. The projector 10 may display the second scene setting screen 100*b*.

After displaying the first scene setting screen 100*a*, the projector 10 in step S307 accepts a selection input from the user. The user operates the input button 13 on the operation panel 11 and thus makes a selection input. A selection input to one selection icon 101 of the plurality of selection icons 101 displayed on the first scene setting screen 100*a* shown in FIG. 5 is accepted. A switching operation input by the user to the display setting field 103 may be accepted.

When the selection input to the selection icon 101 is accepted, the projector 10 in step S309 accepts a scene type corresponding to the selection icon 101 accepted on the first scene setting screen 100*a*. The OSD control unit 23 accepts the scene type corresponding to selection icon 101. The OSD control unit 23 temporarily stores the scene type corresponding to the selection icon 101. The OSD control unit 23 may cause the memory 17 to store the scene type corresponding to the selection icon 101.

When the switching operation input to the display setting field 103 is accepted, the projector 10 in step S309 switches from the screen display mode to the screen non-display mode. The OSD control unit 23 causes the memory 17 to store the screen non-display mode as the mode information, based on the switching operation input.

After storing the scene type corresponding to the selection icon 101, the projector 10 in step S311 displays the detailed setting screen 110. The OSD control unit 23 transmits the detailed setting screen data to the projection unit 30. The OSD control unit 23 causes the detailed setting screen 110 to be projected onto the projection surface SC, based on the detailed setting screen data. The OSD control unit 23 causes the projection unit 30 to project the detailed setting screen 110 and thus to display the detailed setting screen 110 on the projection surface SC.

After displaying the detailed setting screen 110, the projector 10 in step S313 accepts a set value corresponding to the setting icon 111. The user makes an operation input to one setting icon 111, of the plurality of setting icons 111 included in the detailed setting screen 110. The OSD control unit 23 accepts the operation input to the one setting icon 111. When the one setting icon 111 is selected, the user can change the initial set value of the setting item corresponding to the one setting icon 111 to another set value. When the user has changed the initial set value to another set value, the OSD control unit 23 acquires the changed set value as the set value of the setting item. When the user does not change the initial set value, the OSD control unit 23 acquires the initial set value as the set value of the setting item.

When the user has made an operation input to the decision button, which is the input button 13 included in the operation panel 11, the OSD control unit 23 acquires the set value of the setting item corresponding to the setting icon 111. When the user has changed the set values of setting items corresponding to a plurality of setting icons 111, the OSD control unit 23 acquires a set value group formed of a set of the set values of the plurality of setting items. The OSD control unit 23 outputs the acquired set value group to the image control unit 25.

After accepting the set value, the projector 10 in step S315 corrects the image data and displays the corrected image data that is corrected. The image control unit 25 acquires the set value group from the OSD control unit 23. The image control unit 25 corrects the image data, using the set value group. The image control unit 25 outputs the image data that is corrected, as corrected image data, to the projection unit 30. The projection unit 30 projects the projection image PG onto the projection surface SC, based on the corrected image data. The image control unit 25 causes the projection unit 30 to project the projection image PG based on the corrected image data and thus to display the projection image PG on the projection surface SC.

In FIG. 10, the detailed setting screen 110 is displayed in step S311 after the mode information is stored in step S309. However, this configuration is not limiting. When a selection input to the selection icon 101 is accepted, the OSD control unit 23 may acquire the initial set value group corresponding to the selected scene type and may output the initial set value group to the image control unit 25. The image control unit 25 corrects the image data, using the acquired initial set value group. The image control unit 25 causes the projection unit 30 to project the projection image PG, based on the corrected image data that is corrected.

The image data includes the device-specific information 53 identifying the image providing device 50. The display method includes: storing the screen display mode or the screen non-display mode in association with the external device information 19 corresponding to the device-specific information 53; acquiring the device-specific information 53 included in the image data, when the image data is inputted; and displaying the scene setting screen 100 when it is determined that the device-specific information 53 does not correspond to the external device information 19.

When image data is inputted to the projector 10 from the image providing device 50 that has never been connected thereto, the scene setting screen 100 is displayed. The scene setting screen 100 is displayed to a user using the projector 10 for the first time. The user checks the scene setting screen 100 and thus can recognize that various settings can be made.

The display method includes: in the case where it is determined that the device-specific information 53 corresponds to the external device information 19, displaying the scene setting screen 100 when it is determined that the mode information associated with the external device information 19 represents the screen display mode; and not displaying the scene setting screen 100 when it is determined that the mode information represents the screen non-display mode.

The display or non-display of the scene setting screen 100 corresponding to the stored mode information is performed with respect to the image providing device 50 having previously outputted image data to the projector 10. Whether to display the scene setting screen 100 or not can be set for each image providing device 50.

In the embodiments of the present disclosure, a configuration using the projector 10 as a display device is described. However, this configuration is not limiting. Another display device having a display panel for displaying an image may be employed. For example, the display device may be a liquid crystal display device that displays an image on a liquid crystal display panel, a display device that displays an image on an organic EL (electroluminescence) panel, or a self-light-emitting display device such as a monitor, a liquid crystal television or a flat panel display.

A summary of the present disclosure is given below in the form of supplementary notes.

Supplementary Note 1

A display method according to the present disclosure includes: presetting a display mode for displaying a setting screen; accepting an input of an image signal from an external device; and displaying the setting screen, when the image signal is inputted and it is determined that the display mode is in operation.

Since the display mode is preset, the setting screen is displayed regardless of the type of the image signal when the image signal is inputted. A display device can display the setting screen to a user who is not very familiar with user settings. The user of the display device can recognize that a setting related to image adjustment can be made.

Supplementary Note 2

As a display method according to the present disclosure, the display method according to Supplementary Note 1 further includes: accepting an operation to set a non-display mode for not displaying the setting screen, when the setting screen is displayed.

The non-display mode can be selected when the image signal is inputted. When the image signal is inputted to the display device, the user can switch to the non-display mode for not displaying the setting screen.

Supplementary Note 3

As a display method according to the present disclosure, in the display method according to Supplementary Note 2, the setting screen has a switching input field for accepting an operation to switch from the display mode to the non-display mode, and accepting the operation to set the non-display mode for not displaying the setting screen includes: accepting switching input information inputted to the switching input field when the setting screen is displayed; and switching the display mode to the non-display mode, based on the switching input information.

The non-display mode can be set when the setting screen is displayed. The user can select not to display the setting screen the next time the image signal is inputted from the external device.

Supplementary Note 4

As a display method according to the present disclosure, the display method according to Supplementary Note 3 further includes: not displaying the setting screen when the image signal is inputted after the switching to the non-display mode is made.

If the non-display mode is set as the mode information when the setting screen is displayed, the setting screen is not displayed the next time the user inputs the image signal from the external device. The user need not check the setting screen every time the user inputs the image signal from the external device.

Supplementary Note 5

As a display method according to the present disclosure, in the display method according to one of Supplementary Notes 2 to 4, the image signal includes an identification signal that identifies the external device. The display method further includes: storing the display mode or the non-display mode in association with identification information corresponding to the identification signal; acquiring the identification signal included in the image signal, when the image signal is inputted; and displaying the setting screen when it is determined that the identification signal does not correspond to the identification information.

When the image signal is inputted to the display device from the external device that has never been connected thereto, the setting screen is displayed. The setting screen is displayed to a user using the display device for the first time. The user checks the setting screen and thus can recognize that various settings can be made.

Supplementary Note 6

As a display method according to the present disclosure, the display method according to Supplementary Note 5 further includes: in the case where it is determined that the identification signal corresponds to the identification information, displaying the setting screen when it is determined that a mode associated with the identification information is the display mode; and not displaying the setting screen when it is determined that the mode associated with the identification information is the non-display mode.

The display or non-display of the setting screen corresponding to a stored display condition is performed with respect to the external device that has previously outputted the image signal to the display device. Whether to display the setting screen or not can be set for each external device.

Supplementary Note 7

As a display method according to the present disclosure, in the display method according to one of Supplementary Notes 2 to 6, the setting screen has an automatic setting field for switching whether or not to apply an automatic setting to automatically adjust an image displayed based on the image signal. The display method includes: accepting automatic setting information inputted to the automatic setting field when the setting screen is displayed; and switching the display mode to the non-display mode when the automatic setting information indicates that the automatic setting is to be applied.

When the automatic setting is applied, the setting screen is not displayed. When the automatic setting is set, the user may not view the setting screen.

Supplementary Note 8

As a display method according to the present disclosure, the display method according to Supplementary Note 7 further includes: determining an image type based on the image signal, when the image signal is inputted and it is determined that the automatic setting is applied.

When the automatic setting is set, the image type based on the image signal is determined. Therefore, a set value group corresponding to the image type can be set.

Supplementary Note 9

As a display method according to the present disclosure, in the display method according to one of Supplementary Notes 1 to 8, the setting screen includes a first item image and a second item image. The display method further includes: displaying a first display setting screen corresponding to the first item image when a selection input to the first item image is accepted; and displaying a second display setting screen corresponding to the second item image when the selection input to the second item image is accepted.

The first display setting screen corresponding to the first item image that is selected is displayed. The user can set various set values, using the first display setting screen.

Supplementary Note 10

As a display method according to the present disclosure, in the display method according to Supplementary Note 9, the first display setting screen includes an item display field related to image adjustment. The display method includes: accepting an item set value corresponding to the item display field when the first display setting screen is displayed; and displaying an image based on the image signal corrected based on the item set value.

The image correction of the image can be made, based on the set value inputted using the first display setting screen.

Supplementary Note 11

A display device according to the present disclosure includes: an interface circuit that accepts an input of an image signal outputted from an external device; one or a plurality of processors that execute presetting a display mode for displaying a setting screen, and displaying the setting screen, when the image signal is inputted to the interface circuit and it is determined that the display mode is in operation; and a display panel that displays the setting screen under control of the one or plurality of processors.

Since the display mode is preset, the setting screen is displayed regardless of the type of the image signal when the image signal is inputted. The display device can display the setting screen to a user who is not very familiar with user settings. The user of the display device can recognize that a setting related to image adjustment can be made.

Supplementary Note 12

As a display device according to the present disclosure, the display device according to Supplementary Note 11 has an operation panel or a remote controller that accepts an operation to set a non-display mode for not displaying the setting screen when the display panel displays the setting screen.

The user, using the operation panel or the remote controller, can select the non-display mode for not displaying the setting screen when the image signal is inputted. The user can set the mode for not displaying the setting screen when the image signal is inputted.

What is claimed is:

1. A display method comprising:

presetting a display mode for displaying a setting screen;

accepting an input of an image signal from an external device;

displaying the setting screen, when the image signal is inputted and it is determined that the display mode is in operation; and accepting an operation to set a non-display mode for not displaying the setting screen, when the setting screen is displayed, wherein the image signal includes an identification signal that identifies the external device, and the display method further comprises:

storing the display mode or the non-display mode in association with identification information corresponding to the identification signal;

acquiring the identification signal included in the image signal, when the image signal is inputted; and displaying the setting screen when it is determined that the identification signal does not correspond to the identification information.

2. The display method according to claim 1, wherein the setting screen has a switching input field for accepting an operation to switch from the display mode to the non-display mode, and accepting the operation to set the non-display mode for not displaying the setting screen comprises:

accepting switching input information inputted to the switching input field when the setting screen is displayed; and switching the display mode to the non-display mode, based on the switching input information.

3. The display method according to claim 2, further comprising:

not displaying the setting screen when the image signal is inputted after switching to the non-display mode is made.

4. The display method according to claim 1, further comprising:

in the case where it is determined that the identification signal corresponds to the identification information, displaying the setting screen when it is determined that a mode associated with the identification information is the display mode; and not displaying the setting screen when it is determined that the mode associated with the identification information is the non-display mode.

5. The display method according to claim 1, wherein the setting screen has an automatic setting field for switching whether or not to apply an automatic setting to automatically adjust an image displayed based on the image signal, and the display method comprises:

accepting automatic setting information inputted to the automatic setting field when the setting screen is displayed; and switching the display mode to the non-display mode when the automatic setting information indicates that the automatic setting is to be applied.

6. The display method according to claim 5, further comprising:

determining an image type based on the image signal, when the image signal is inputted and it is determined that the automatic setting is applied.

7. The display method according to claim 1, wherein the setting screen includes a first item image and a second item image, and the display method further comprises:

displaying a first display setting screen corresponding to the first item image when a selection input to the first item image is accepted; and displaying a second display setting screen corresponding to the second item image when the selection input to the second item image is accepted.

8. The display method according to claim 7, wherein the first display setting screen includes an item display field related to image adjustment, and the display method comprises:

accepting an item set value corresponding to the item display field when the first display setting screen is displayed; and displaying an image based on the image signal corrected based on the item set value.

9. A display device comprising:

an interface circuit that accepts an input of an image signal outputted from an external device;

one or a plurality of processors that execute presetting a display mode for displaying a setting screen, and displaying the setting screen, when the image signal is inputted to the interface circuit and it is determined that the display mode is in operation; and a display panel that displays the setting screen under control of the one or plurality of processors, wherein the image signal includes an identification signal that identifies the external device, and the one or a plurality of processors further execute accepting an operation to set a non-display mode for not displaying the setting screen, when the setting screen is displayed;

storing the display mode or the non-display mode in association with identification information corresponding to the identification signal;

acquiring the identification signal included in the image signal, when the image signal is inputted; and displaying the setting screen when it is determined that the identification signal does not correspond to the identification information.

10. The display device according to claim 9, comprising:

an operation panel or a remote controller that accepts an operation to set a non-display mode for not displaying the setting screen when the display panel displays the setting screen.

11. The display device according to claim 9, wherein the setting screen has a switching input field for accepting an operation to switch from the display mode to the non-display mode, and accepting the operation to set the non-display mode for not displaying the setting screen comprises:

accepting switching input information inputted to the switching input field when the setting screen is displayed; and switching the display mode to the non-display mode, based on the switching input information.

12. The display device according to claim 11, further comprising:

not displaying the setting screen when the image signal is inputted after switching to the non-display mode is made.

13. The display device according to claim 9, further comprising:

the one or a plurality of processors further execute, in the case where it is determined that the identification signal corresponds to the identification information, displaying the setting screen when it is determined that a mode associated with the identification information is the display mode; and not displaying the setting screen when it is determined that the mode associated with the identification information is the non-display mode.

14. The display device according to claim 11, wherein the setting screen includes a first item image and a second item image, and the one or a plurality of processors further execute:

displaying a first display setting screen corresponding to the first item image when a selection input to the first item image is accepted; and displaying a second display setting screen corresponding to the second item image when the selection input to the second item image is accepted.

15. A display method comprising:

presetting a display mode for displaying a setting screen;

accepting an input of an image signal from an external device;

displaying the setting screen, when the image signal is inputted and it is determined that the display mode is in operation; and accepting an operation to set a non-display mode for not displaying the setting screen, when the setting screen is displayed, wherein the setting screen has an automatic setting field for switching whether or not to apply an automatic setting to automatically adjust an image displayed based on the image signal, and the display method comprises:

accepting automatic setting information inputted to the automatic setting field when the setting screen is displayed; and switching the display mode to the non-display mode when the automatic setting information indicates that the automatic setting is to be applied.

16. The display method according to claim 15, wherein the setting screen has a switching input field for accepting an operation to switch from the display mode to the non-display mode, and accepting the operation to set the non-display mode for not displaying the setting screen comprises:

accepting switching input information inputted to the switching input field when the setting screen is displayed; and switching the display mode to the non-display mode, based on the switching input information.

17. The display method according to claim 16, further comprising:

not displaying the setting screen when the image signal is inputted after switching to the non-display mode is made.

18. The display method according to claim 15, further comprising:

determining an image type based on the image signal, when the image signal is inputted and it is determined that the automatic setting is applied.

19. The display method according to claim 15, wherein the setting screen includes a first item image and a second item image, and the display method further comprises:

displaying a first display setting screen corresponding to the first item image when a selection input to the first item image is accepted; and displaying a second display setting screen corresponding to the second item image when the selection input to the second item image is accepted.

20. The display method according to claim 19, wherein the first display setting screen includes an item display field related to image adjustment, and the display method comprises:

accepting an item set value corresponding to the item display field when the first display setting screen is displayed; and displaying an image based on the image signal corrected based on the item set value.

* * * * *